US009851077B2

(12) United States Patent
Demuynck

(10) Patent No.: US 9,851,077 B2
(45) Date of Patent: Dec. 26, 2017

(54) LED LAMP WITH COMPACT FLUORESCENT LAMP FORM FACTOR

(71) Applicant: Cree, Inc., Durham, NC (US)

(72) Inventor: Randy Demuynck, Wake Forest, NC (US)

(73) Assignee: Cree, Inc., Durham, NC (US)

( * ) Notice: Subject to any disclaimer, the term of this patent is extended or adjusted under 35 U.S.C. 154(b) by 109 days.

(21) Appl. No.: 14/630,926

(22) Filed: Feb. 25, 2015

(65) Prior Publication Data
US 2016/0245462 A1    Aug. 25, 2016

(51) Int. Cl.
*F21V 19/00* (2006.01)
*F21V 29/506* (2015.01)
*F21V 29/83* (2015.01)
*F21K 9/232* (2016.01)
*F21K 9/237* (2016.01)
*F21V 29/77* (2015.01)
*F21V 3/02* (2006.01)
*F21V 23/00* (2015.01)
*F21V 23/04* (2006.01)
*F21Y 115/10* (2016.01)
*F21K 9/238* (2016.01)

(52) U.S. Cl.
CPC ............ *F21V 19/003* (2013.01); *F21K 9/232* (2016.08); *F21K 9/237* (2016.08); *F21V 29/506* (2015.01); *F21V 29/83* (2015.01); *F21K 9/238* (2016.08); *F21V 3/02* (2013.01); *F21V 23/006* (2013.01); *F21V 23/045* (2013.01); *F21V 29/77* (2015.01); *F21Y 2115/10* (2016.08)

(58) Field of Classification Search
CPC .. F21Y 2101/02; F21Y 2115/10; F21K 9/135; F21K 9/232; F21K 9/238; F21V 29/004; F21V 19/003; F21V 19/004
See application file for complete search history.

(56) References Cited

U.S. PATENT DOCUMENTS

| 5,122,938 | A  | * | 6/1992 | Pastusek | F21L 15/06 |
|           |    |   |        |          | 362/203 |
| 7,213,940 | B1 |   | 5/2007 | Van De Ven et al. | |
| 7,628,513 | B2 | * | 12/2009 | Chiu | F21K 9/137 |
|           |    |   |        |          | 362/240 |

(Continued)

OTHER PUBLICATIONS

U.S. Appl. No. 61/932,058, filed Jan. 27, 2014.
U.S. Appl. No. 14/292,286, filed May 30, 2014.

*Primary Examiner* — Robert May
(74) *Attorney, Agent, or Firm* — Dennis J. Williamson; Moore & Van Allen PLLC

(57) ABSTRACT

The LED lamp has a relatively long, narrow configuration similar to that of CFL bulbs. Because the lamp operates at relatively high power and produces significant lumens, a significant amount of heat is generated by the LED assembly. The interior envelope of the lamp, defined in traditional CFL bulbs by the fluorescent tubes, is used to house a heat sink having a shape and dimensions to fit inside of the form factor of the CFL tubes. The heat sink substantially fills the interior space of the optically transmissive enclosure in order to provide maximum surface area for dissipating heat from the LEDs. A plurality of fins may extend from the heat sink to the exterior of the lamp to dissipate heat from the LEDs to the ambient environment.

20 Claims, 23 Drawing Sheets

(56) References Cited

U.S. PATENT DOCUMENTS

| | | | |
|---|---|---|---|
| 7,654,699 B2* | 2/2010 | Chang | F21V 29/02 362/294 |
| 8,092,045 B2* | 1/2012 | Xiao | F21V 19/0055 362/249.02 |
| 8,154,181 B1 | 4/2012 | Lin et al. | |
| 8,197,091 B1* | 6/2012 | Kyle | F21V 29/004 362/249.06 |
| 8,414,160 B2* | 4/2013 | Sun | F21V 29/2206 313/46 |
| 8,591,062 B2* | 11/2013 | Hussell | F21V 7/00 362/219 |
| 2008/0158887 A1* | 7/2008 | Zhu | F21V 29/004 362/294 |
| 2012/0051041 A1 | 3/2012 | Edmond et al. | |
| 2012/0230026 A1* | 9/2012 | Li | F21K 9/1355 362/235 |
| 2013/0119872 A1 | 5/2013 | Chobot | |
| 2014/0001959 A1 | 1/2014 | Motley et al. | |
| 2014/0001963 A1 | 1/2014 | Chobot et al. | |
| 2014/0132164 A1 | 5/2014 | McBryde et al. | |
| 2014/0167620 A1 | 6/2014 | Chobot | |
| 2014/0167622 A1 | 6/2014 | Chobot et al. | |
| 2014/0167623 A1 | 6/2014 | Chobot et al. | |
| 2014/0167642 A1 | 6/2014 | Chobot | |
| 2014/0167653 A1 | 6/2014 | Chobot | |
| 2014/0203717 A1 | 7/2014 | Zhang | |
| 2014/0204571 A1 | 7/2014 | Zhang et al. | |
| 2014/0225520 A1 | 8/2014 | Zhang | |
| 2014/0268790 A1 | 9/2014 | Chobot et al. | |
| 2015/0102729 A1 | 4/2015 | Creasman et al. | |

\* cited by examiner

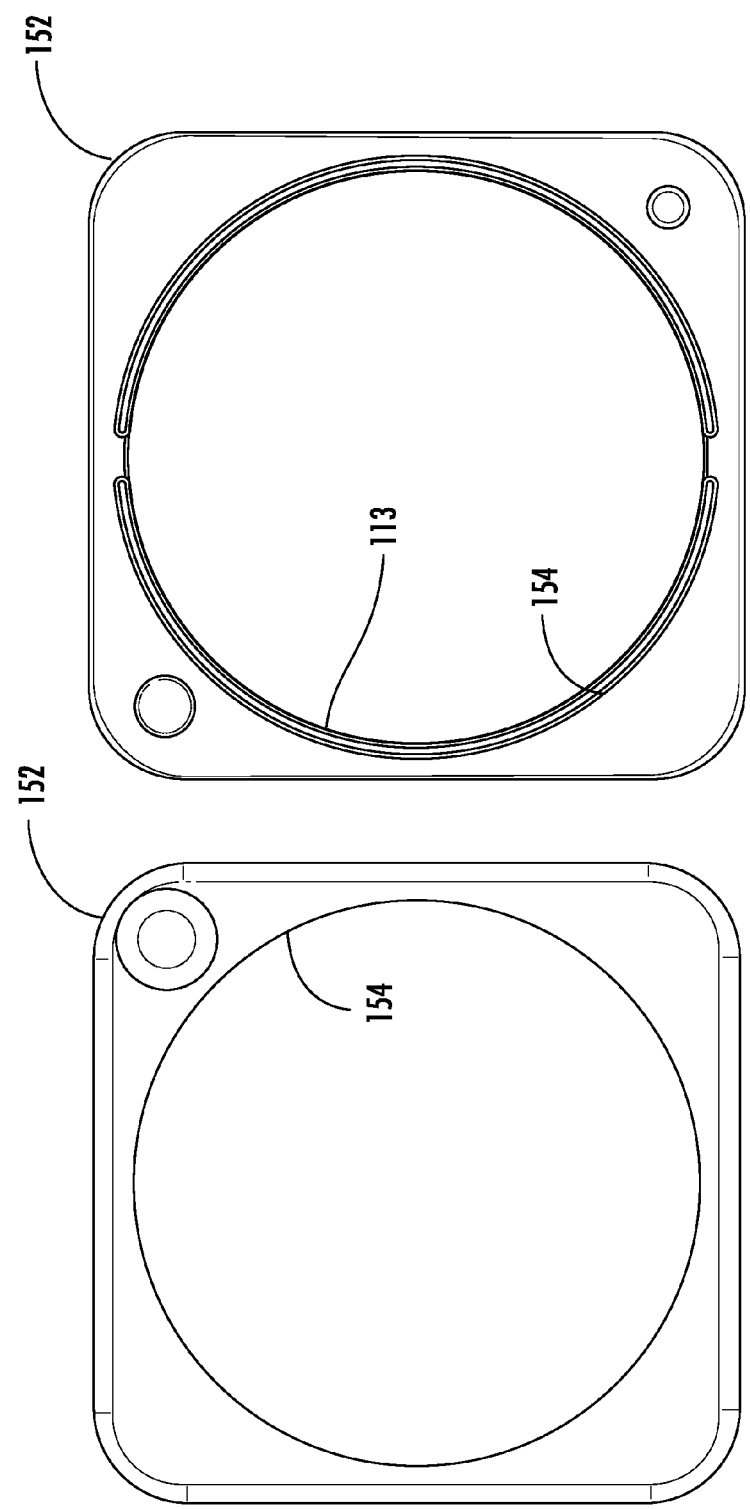

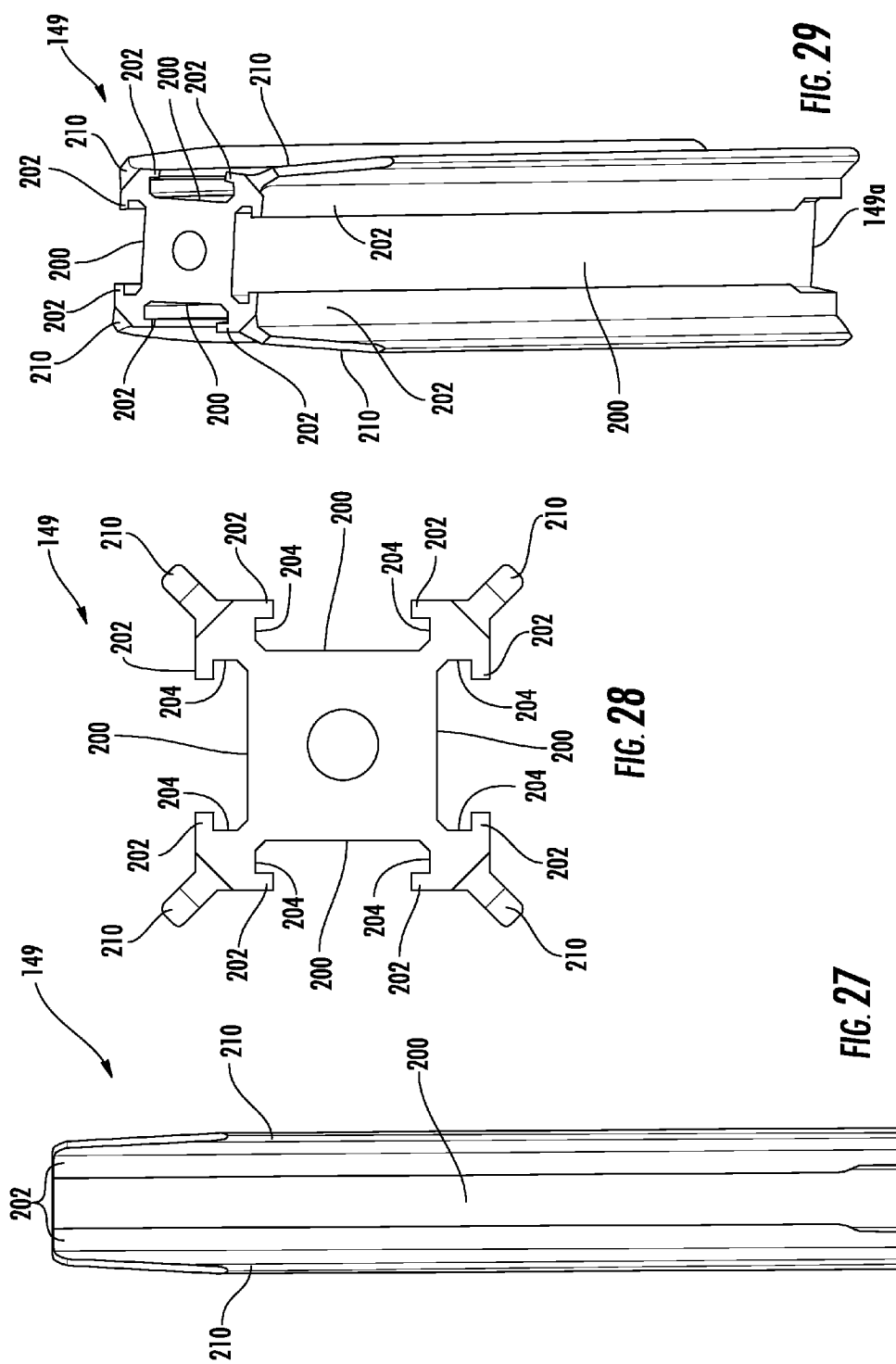

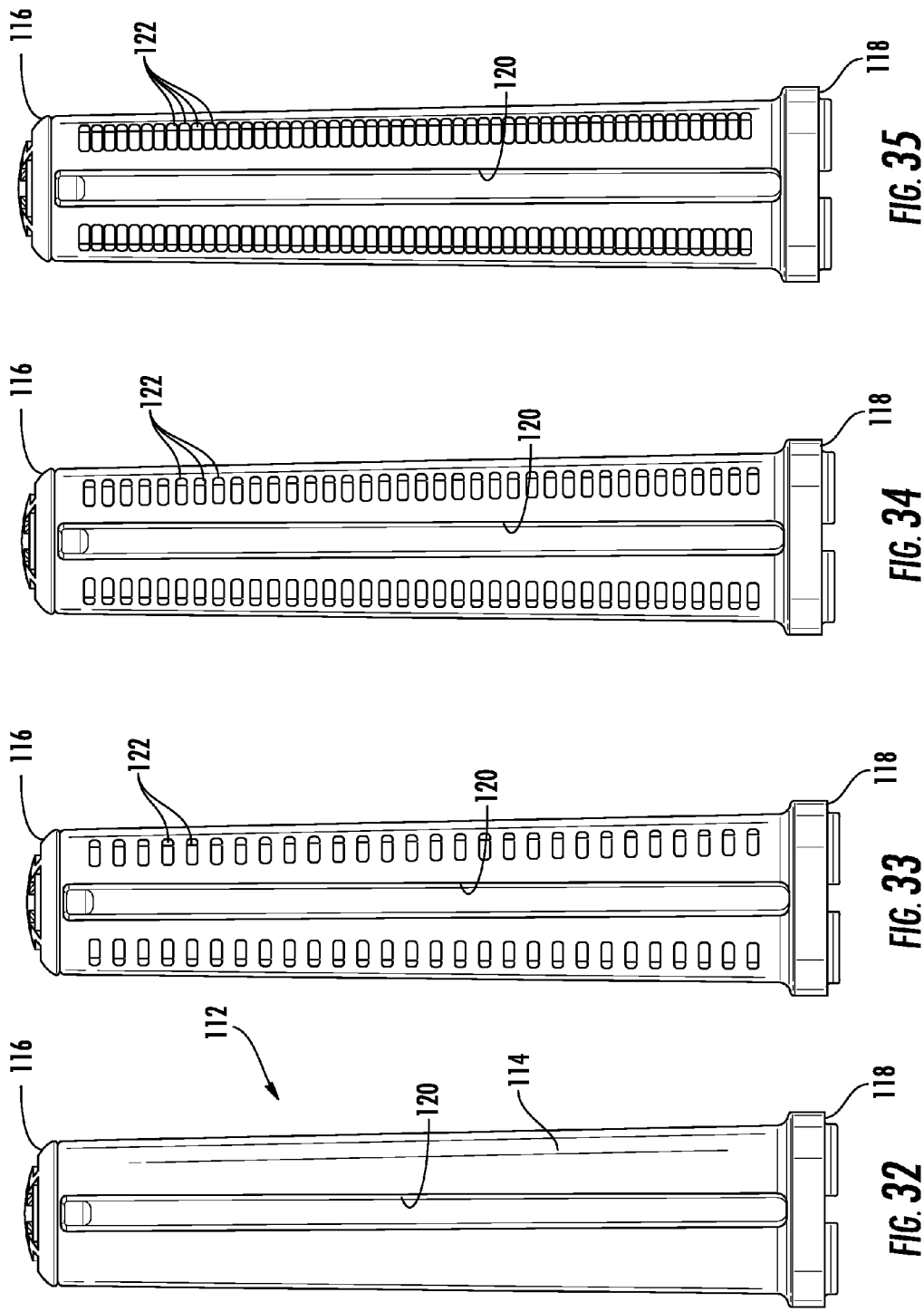

LED LAMP WITH COMPACT FLUORESCENT LAMP FORM FACTOR

BACKGROUND

Light emitting diode (LED) lighting systems are becoming more prevalent as replacements for legacy lighting systems. LED systems are an example of solid state lighting (SSL) and have advantages over traditional lighting solutions such as incandescent and fluorescent lighting because they use less energy, are more durable, operate longer, can be combined in multi-color arrays that can be controlled to deliver reflectedly any color light, and generally contain no lead or mercury. A solid-state lighting system may take the form of a luminaire, lighting unit, light fixture, light bulb, or a "lamp."

An LED lighting system may include, for example, a packaged light emitting device including one or more light emitting diodes (LEDs), which may include inorganic LEDs, which may include semiconductor layers forming p-n junctions and/or organic LEDs, which may include organic light emission layers. Light perceived as white or near-white may be generated by a combination of red, green, and blue ("RGB") LEDs. Output color of such a device may be altered by separately adjusting supply of current to the red, green, and blue LEDs. Another method for generating white or near-white light is by using a lumiphor such as a phosphor. Still another approach for producing white light is to stimulate phosphors or dyes of multiple colors with an LED source. Many other approaches can be taken.

An LED lamp may be made with a form factor that allows it to replace a standard incandescent or fluorescent bulbs. LED lamps often include some type of optical element or elements to allow for localized mixing of colors, collimate light, or provide a particular light pattern. Sometimes the optical element also serves as an enclosure for the electronics and/or the LEDs in the lamp.

Since, ideally, an LED lamp designed as a replacement for a traditional incandescent or fluorescent light source needs to be self-contained; a power supply is included in the lamp structure along with the LEDs or LED packages and the optical components. A separate heatsink is also often needed to cool the LEDs and/or power supply in order to maintain appropriate operating temperature.

SUMMARY OF THE INVENTION

In some embodiments a lamp comprises a base comprising at least one pin connector. An elongated heat sink extends from the base and defines at least four mounting surfaces extending along a longitudinal axis of the lamp. A plurality of LED assemblies where each of the plurality of LED assemblies comprises at least one LED. At least one of the plurality of LED assemblies is mounted on each of the four mounting surfaces. The plurality of LED assemblies are electrically coupled to the at least one pin connector through an electrical path. An at least partially optically transmissive enclosure defines an interior space having a first height and the heat sink has a second height where the second height is substantially the same as the first height.

The lamp may have a length of between approximately 4 inches and approximately 8½ inches. The lamp may have a width of approximately 1 inch to approximately 2 inches. The at least one LED may be equivalent in brightness to at least a 13 Watt CFL lamp. The base may comprise a lower housing, an upper housing and a middle housing where the upper housing and the middle housing are made of a thermally conductive material and where first engagement members on one of the lower housing and the middle housing engage mating second engagement members on the other one of the lower housing and the middle housing to connect the middle housing to the lower housing in a snap-fit connection. Lamp electronics in the electrical path may be mounted in the base using a interconnect. The interconnect may comprise a plurality of third engagement members that engage a plurality of mating fourth engagement members on the optically transmissive enclosure in a snap-fit connection to hold the enclosure to the base. The lamp electronics may be mounted on an electronics board and the interconnect may comprise a plurality of fifth engagement members that engage the electronics board. The lamp electronics may be mounted on an electronics board and spring conductors may be electrically coupled to the electronics board that are biased into engagement with the LED assemblies. The spring conductors may be inserted through apertures formed in the interconnect. The heat sink may be formed as a tower that extends from the base along the longitudinal axis of the lamp. Each of the mounting surfaces may comprise a generally planar surface that is thermally coupled to the at least one of the plurality of LED assemblies. A plurality of fins may extend from the heat sink to the exterior of the lamp to dissipate heat from the LEDs to the ambient environment. The may operate to produce at least 80 lumens per Watt. The base may comprise a first housing and a second housing where the first housing and the second housing are movable relative to one another to actuate a switch to control power to the plurality of LED assemblies through the electrical path.

In some embodiments a lamp comprises a base comprising at least one pin connector. An elongated heat sink extends from the base and defines a mounting surface extending along a longitudinal axis of the lamp. At least one LED assembly comprising at least one LED is mounted on the mounting surface. The LED is electrically coupled to the at least one pin connector through an electrical path to emit light when energized through the electrical path. The at least one LED assembly operates at between 16 and 19 Watts and produces at least 900 lumens. An optically transmissive enclosure surrounds at least a portion of the heat sink.

The lamp may emit light with a CRI greater than or equal to approximately 90. The lamp may emit light with a CCT in a range of between approximately 2700 and 4000K. A plurality of LEDs may extend from adjacent the base to adjacent a distal end of the heat sink such that light is emitted over substantially the length of the heat sink. The enclosure may comprise apertures that allow air to circulate across the heat sink.

In some embodiments a LED lamp comprises a LED board supporting at least one LED. A heat sink supports the LED board. The heat sink and the LED board are located in the enclosure. A lamp electronics board is provided that is in the electrical path to the LED board. An interconnect comprises a first engagement member for engaging the enclosure, a second engagement member for securing the lamp electronics board to the interconnect, and a first electrical contact electrically coupled to the LED board and second electrical contact electrically coupled to the lamp electronics board.

In some embodiments an interconnect for a LED lamp comprises a first engagement member configured to engage an enclosure, a second engagement member configured to secure a lamp electronics board to the interconnect, and a first electrical contact configured to electrically couple to the LED board and second electrical contact configured to electrically coupled to the lamp electronics board.

BRIEF DESCRIPTION OF THE DRAWINGS

FIG. 14 is a bottom view of an embodiment of the middle housing usable in the lamp of the invention.

FIG. 15 is a top view of the middle housing of FIG. 14.

FIG. 27 is a plan view of an embodiment of the heat sink usable in the lamp of the invention.

FIG. 28 is a top view of the heat sink of FIG. 27.

FIG. 29 is a perspective view of the heat sink of FIG. 27.

FIGS. 32-35 are alternate embodiments of the optically transmissive enclosure usable in the lamp of the invention.

DETAILED DESCRIPTION

Figure 1:
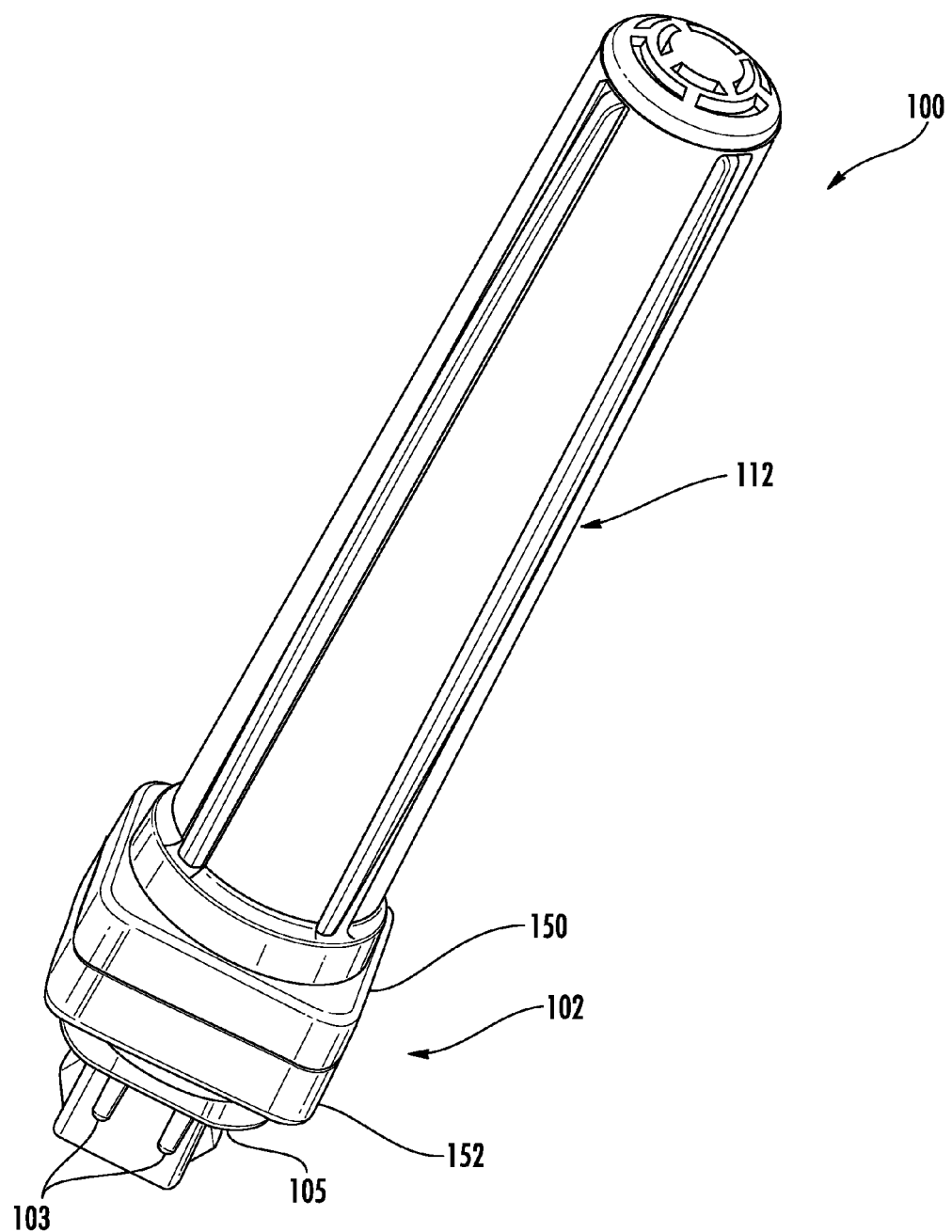
FIG. 1 is a perspective view of an embodiment of a lamp of the invention.
Figure 2:
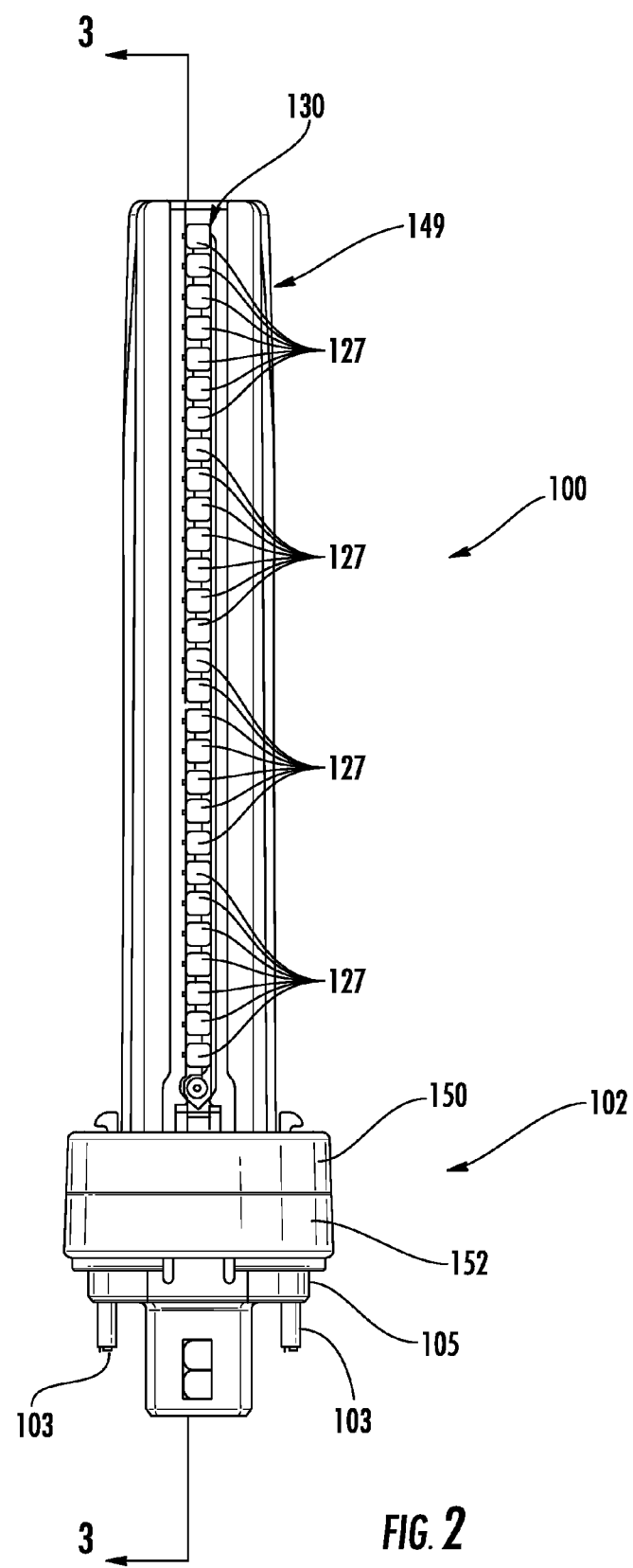
FIG. 2 is a plan view of the lamp of FIG. 1 with the optically transmissive enclosure removed.
Figure 3:
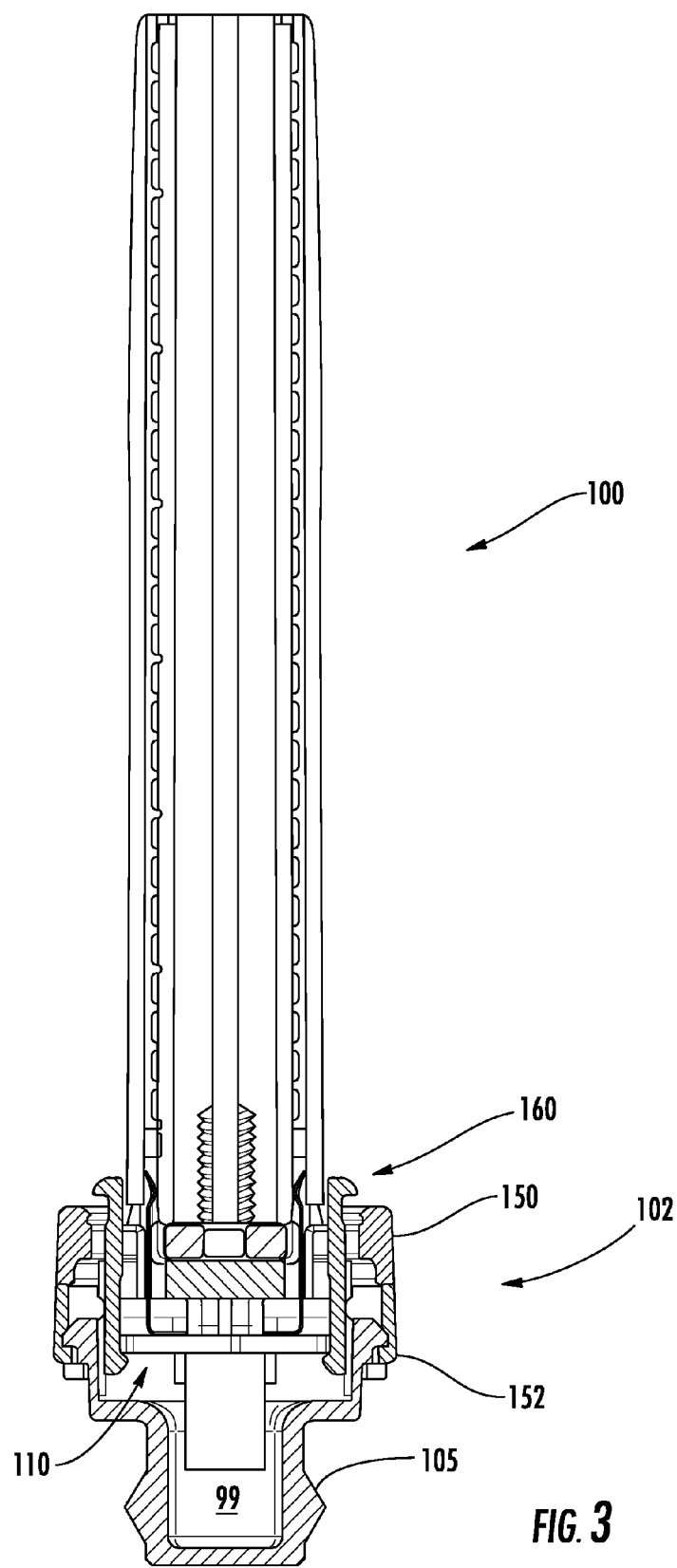
FIG. 3 is a section view of the lamp taken along line 3-3 of FIG. 2.
Figure 4:
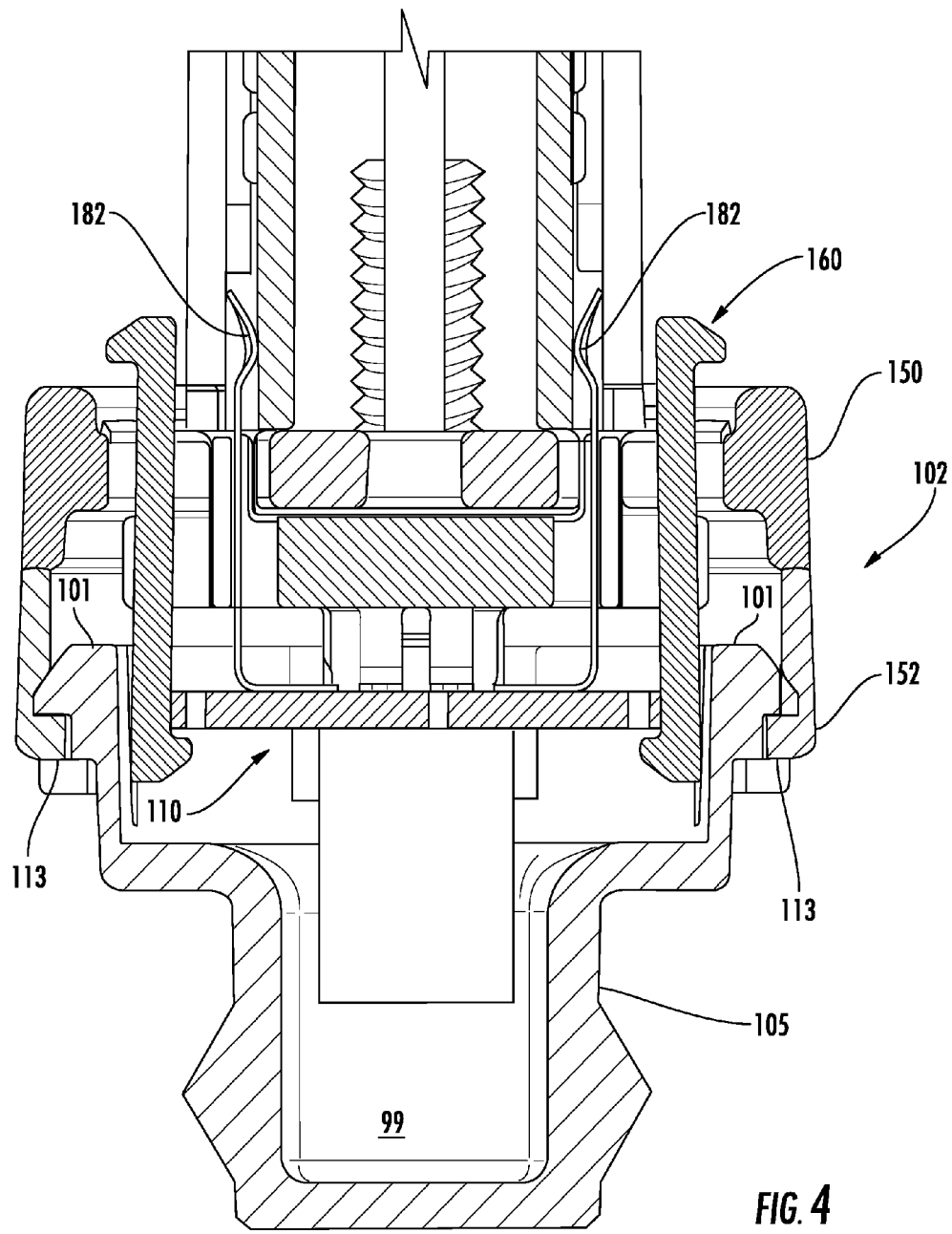
FIG. 4 is a detailed section view of the lamp of FIG. 1.
Figure 5:
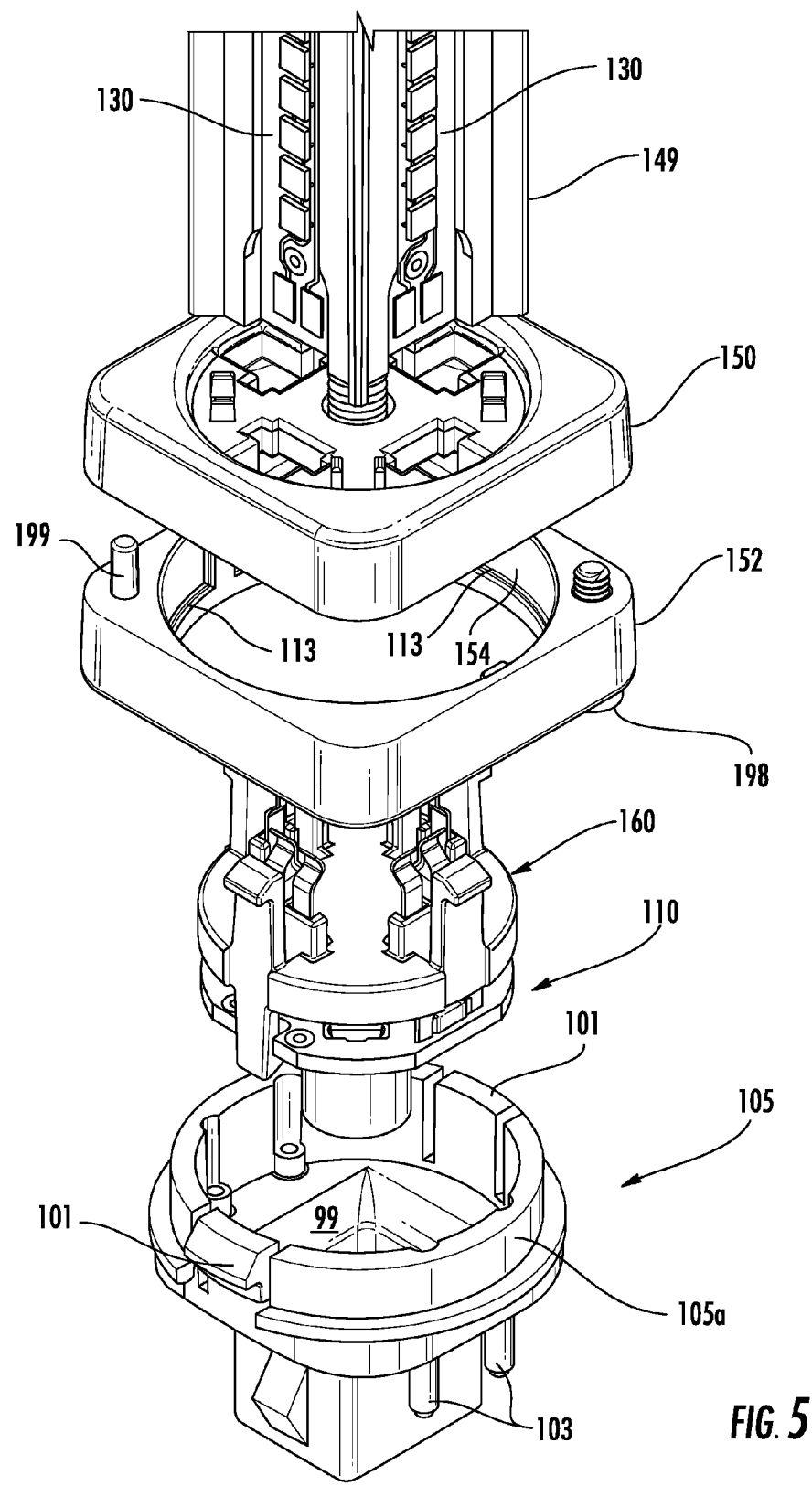
FIGS. 5-7 are exploded views of the lamp of FIG. 1.
Figure 6:
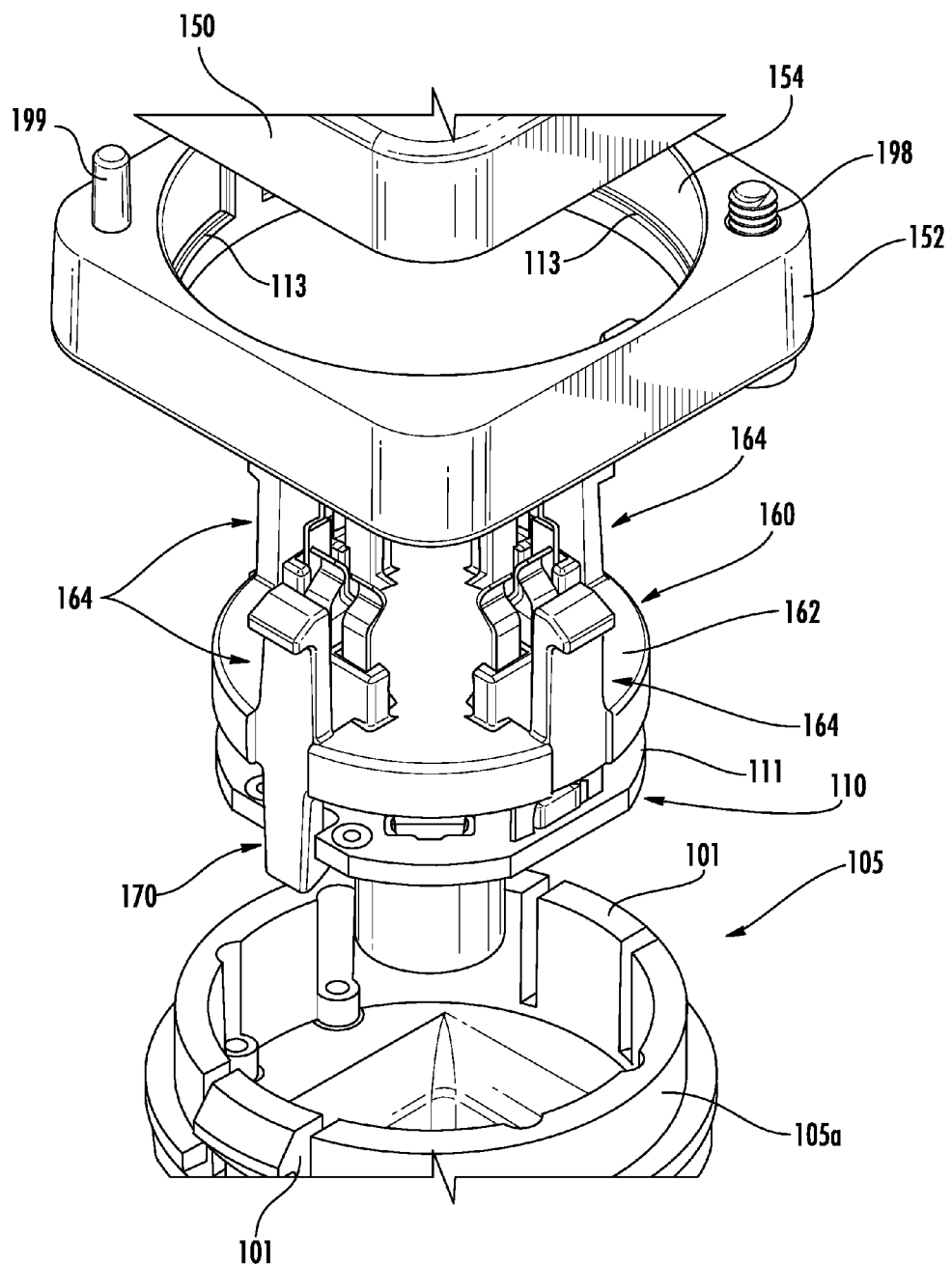
Figure 7:
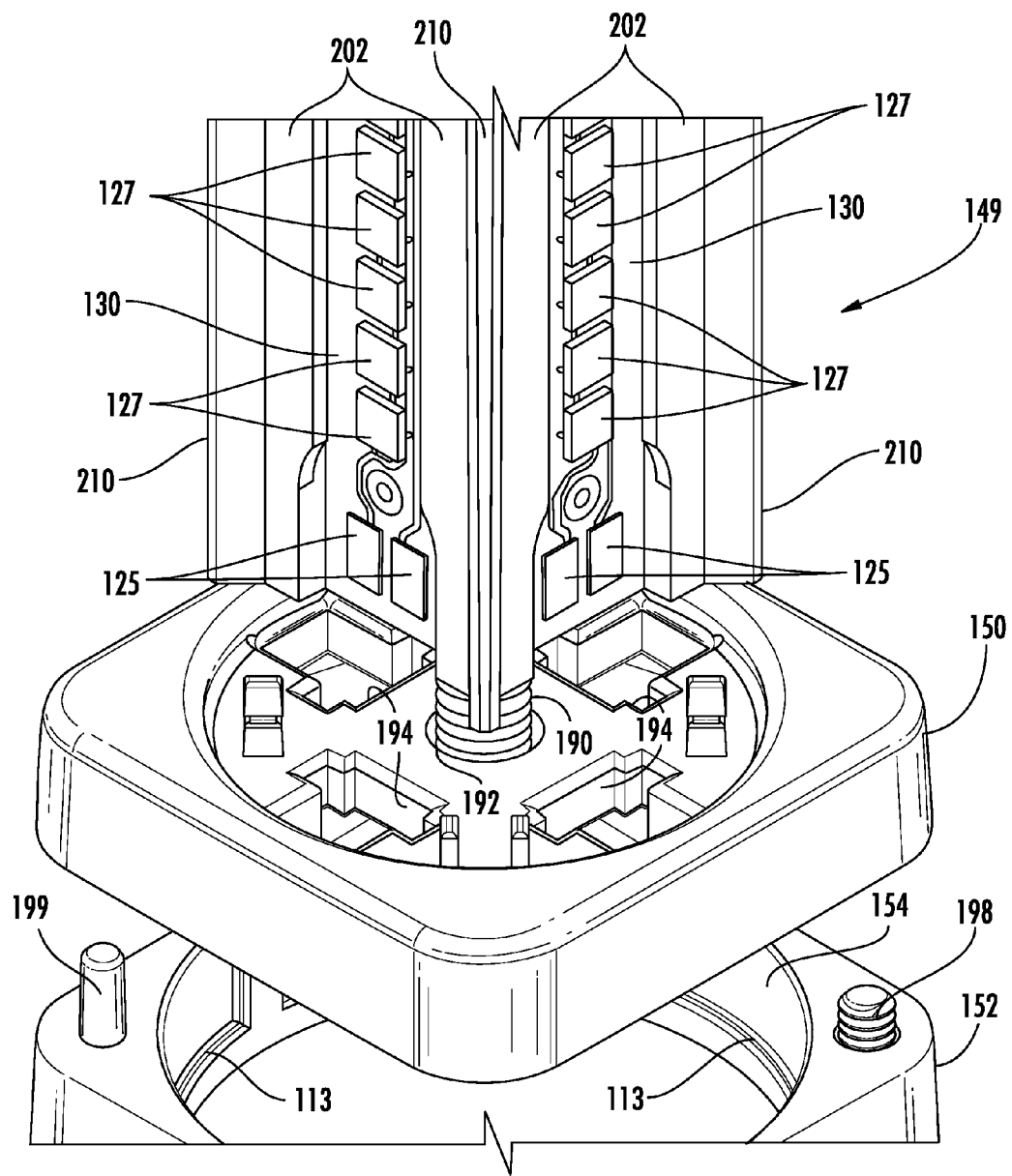

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" or "top" or "bottom" may be used herein to describe a relationship of one element, layer or region to another element, layer or region as illustrated in the figures. It will be understood that these terms are intended to encompass different orientations of the device in addition to the orientation depicted in the figures.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Unless otherwise expressly stated, comparative, quantitative terms such as "less" and "greater", are intended to encompass the concept of equality. As an example, "less" can mean not only "less" in the strictest mathematical sense, but also, "less than or equal to."

The terms "LED" and "LED device" as used herein may refer to any solid-state light emitter. The terms "solid state light emitter" or "solid state emitter" may include a light emitting diode, laser diode, organic light emitting diode, and/or other semiconductor device which includes one or more semiconductor layers, which may include silicon, silicon carbide, gallium nitride and/or other semiconductor materials, a substrate which may include sapphire, silicon, silicon carbide and/or other microelectronic substrates, and one or more contact layers which may include metal and/or other conductive materials. A solid-state lighting device produces light (ultraviolet, visible, or infrared) by exciting electrons across the band gap between a conduction band and a valence band of a semiconductor active (light-emitting) layer, with the electron transition generating light at a wavelength that depends on the band gap. Thus, the color (wavelength) of the light emitted by a solid-state emitter depends on the materials of the active layers thereof. In various embodiments, solid-state light emitters may have peak wavelengths in the visible range and/or be used in combination with lumiphoric materials having peak wavelengths in the visible range. Multiple solid state light emitters and/or multiple lumiphoric materials (i.e., in combination with at least one solid state light emitter) may be used in a single device, such as to produce light perceived as white or near white in character. In certain embodiments, the aggregated output of multiple solid-state light emitters and/or lumiphoric materials may generate warm white light output having a color temperature range of from about 2200K to about 6000K.

Solid state light emitters may be used individually or in combination with one or more lumiphoric materials (e.g., phosphors, scintillators, lumiphoric inks) and/or optical elements to generate light at a peak wavelength, or of at least one desired perceived color (including combinations of colors that may be perceived as white). Inclusion of lumiphoric (also called 'luminescent') materials in lighting devices as described herein may be accomplished by direct coating on solid state light emitter, adding such materials to encapsulants, adding such materials to lenses, by embedding or dispersing such materials within lumiphor support elements, and/or coating such materials on lumiphor support elements. Other materials, such as light scattering elements (e.g., particles) and/or index matching materials, may be associated with a lumiphor, a lumiphor binding medium, or a lumiphor support element that may be spatially segregated from a solid state emitter.

It should also be noted that the term "lamp" is meant to encompass not only a solid-state replacement for a traditional fluorescent bulb as illustrated herein, but also replacements for incandescent bulbs, replacements for complete fixtures, and any type of light fixture that may be custom designed as a solid state fixture.

Figure 41:
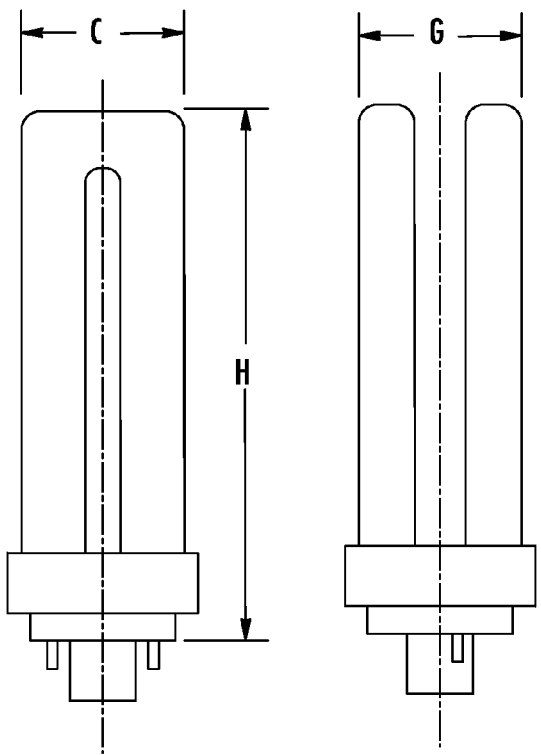
FIGS. 41 and 42 set forth the dimensional drawings from the ANSI standard for Quad single-based fluorescent lamps.
Figure 42:
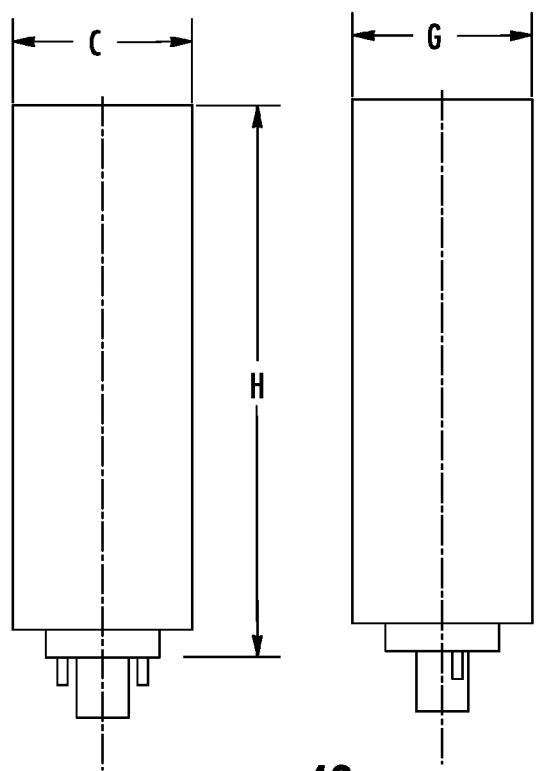

The figures show a lamp, 100, according to some embodiments of the present invention embodied in a form factor of a traditional compact fluorescent lamp (CFL) bulb. In one embodiment, the enclosure and base are dimensioned to be a replacement for an ANSI standard CFL bulbs such that the shape and dimensions of the lamp 100 may fall within the shape and dimensions for standard traditional CFL bulbs. For example, traditional CFL bulbs may comprise a base having a two or four pin connection that is physically and electrically coupled to one or more relatively small fluorescent tubes. The lamp has a relatively long, narrow configuration. The dimensions for ANSI Standard for "Single-Based Fluorescent Lamps" is set forth in CDV C78.901-201x. FIGS. 41 and 42 set forth the dimensional drawings from this standard for Quad single-based fluorescent lamps. FIG. 41 sets forth the Quad finished product drawing and FIG. 42 sets forth the Quad maximum outline drawing. The maximum dimensions for a finished quad lamp for an 18-Watt lamp are height (H) 150 mm, width C 28 mm, and depth (G) 28 mm and the maximum dimension for a lamp outline are height (H) 150 mm, width C 35 mm, and depth (G) 35 mm. The maximum dimensions for a finished lamp for a 26-Watt quad lamp are height (H) 170 mm, width C 28 mm, and depth (G) 28 mm and the maximum dimension for a lamp outline are height (H) 170 mm, width C 35 mm, and depth (G) 35 mm. The height H is from the base face to the top of the lamp. CFLs are made in a variety of wattages and are made as quad (4 tubes) lamps and twin (2 tubes) lamps. Twin lamps have a finished lamp size range of: height H between approximately 85-170 mm; width C approximately 28 mm; and depth G of approximately 13 mm. Quad lamps have a finished lamp size range of: height H between approximately 88-170 mm; width C of approximately 28 mm or 41 mm; and depth G of approximately 28 mm or 41 mm. The lamp of the invention meets the dimension standards for equivalent wattage lamps. The configuration of lamp 100 is similar to the configuration of traditional tubular type CFL bulbs having a base 102 that provides the physical and electrical connections between the lamp and a corresponding socket and an elongated optically transmissive enclosure 112. In the lamp 100, light is emitted from the lamp in a pattern similar to the light pattern emitted from CFL tube bulbs and in one embodiment the lamp may comply with ENERGY STAR® Program Requirements. The lamp of the invention may be embodied in different forms including standard and non-standard form factors. In other embodiments, the LED lamp can have any shape, including standard and non-standard shapes. The lamp 100 has a relatively long, narrow configuration similar to that of CFL bulbs. The lamp 100 may range in height from approximately 85 mm to approximately 170 mm with a width of approximately 28 mm-41 mm and a depth of approximately 13 mm-41 mm. Thus, in some embodiments the height of the lamp of the invention is approximately 5-6 times the depth and width of the lamp. In some embodiments the height of the lamp of the invention is approximately 3-13 times the depth and width of the lamp In some embodiments, the LED lamp may be equivalent in brightness to standard watt CFL bulbs such as, but not limited to, 13 Watt, 18 Watt, 26 Watt, 32 Watt, 42 Watt, 57 Watt and 70 Watt or other wattages.

Lamp 100 may be used with a two pin or a four pin base where a two pin base may be used with magnetic ballasts and a four pin base may be used with electronic ballasts. A lamp base, such as the pin four base 102, functions as the electrical and physical connector to connect the lamp 100 to a corresponding electrical socket or other power source. Depending on the embodiment, other base configurations are possible to make the electrical connection such as other standard bases or non-standard bases including Edison bases. The base 102 comprises electrically conductive pins 103 for connecting to a corresponding socket and may comprise a lower housing 105 connected to and supporting the pins 103. The illustrated embodiment shows a four pin base; however, the base may use a two pin connector, Edison screw or other connector. The lower housing 105 may be made of an electrically insulating material such as plastic. In some embodiments the lower housing 105 may comprise a thermally conductive material where heat may be dissipated from the lamp in part using the lower housing 105.

The lower housing 105 defines an internal cavity 109 for receiving the electronics 110 of the lamp including the power supply and/or drivers or a portion of the electronics for the lamp. In some embodiments a ballast may be located in the base. The lamp electronics 110 are electrically coupled to the pins 103 such that the electrical connection may be made from the pins 103 to the lamp electronics 110. The lamp electronics may be mounted on a printed circuit board 111 which may include the power supply along with the driver circuitry. The base may be potted to protect and isolate the lamp electronics 110.

The base 102 further comprises a upper housing 150 and a middle housing 152 for connecting the lower housing 105 to the heat sink 149 and optically transmissive enclosure or lens 112. The upper housing 150 and middle housing 152 may be made of a thermally conductive material such as aluminum or zinc and may be thermally coupled to the heat sink 149 as will be described such that the upper housing 150 and middle housing 152 form part of the heat sink structure of the lamp. The middle housing 152 defines an opening 154 that receives the upper end 105a of lower housing 105. In one embodiment the upper end 105a of lower housing 105 and the opening 154 are cylindrical. First engagement members on the lower housing 105 may engage mating second engagement members on the middle housing 152 to connect the middle housing 152 to the lower housing 105. In one embodiment, the first engagement members comprise deformable resilient fingers 101 that comprise a camming surface 107 and a lock surface 109. The second engagement member comprises a fixed member 113 in the form of a protrusion or protrusions formed on the inside of opening 154. In the illustrated embodiment two fingers 101 are provided although a greater or fewer number of fingers may be provided. The fingers 101 may be made as one-piece with the lower housing 105. For example, the lower housing 105 and fingers 101 may be molded of plastic. The protrusions 113 define fixed members that may be engaged by the lock members 109 to lock the lower housing 105 to the middle housing 152. The lower housing 105 may be moved toward the bottom of the middle housing 152 such that the upper end 105a of lower housing 105 is inserted into the opening 154. The camming surfaces 107 of the fingers 101 contact the edge of the opening 154. The engagement of the camming surfaces 107 with the middle housing 152 deforms the fingers 101 to allow the locking members 109 to move past the fixed member 113. As the lock member 109 passes the fixed member 113 the fingers 101 return toward their undeformed state such that the lock members 109 are disposed behind the fixed members 113. The engagement of the lock members 109 with the fixed members 113 fixes the lower housing 105 to the middle housing 152. The snap-fit connection allows the lower housing 105 to be fixed to the middle housing 152 in a simple insertion operation without the need for any additional connection mechanisms, tools or assembly steps. While one embodiment of the snap-fit connection is shown numerous changes may be made. For example, the deformable members such as fingers 101 may be formed on the middle housing 152 and the fixed members may be formed on the lower housing 105. Moreover, both engagement members may be deformable. Further, rather than using a snap-fit connection, the lower housing 105 may be fixed to the middle housing 152 using other connection mechanisms such as a screwthreads, separate fasteners, friction fit or the like.

The lamp electronics 110 may be mounted in the base 102 using a interconnect 160. The lamp electronics may be mounted on a rigid substrate such as a PCB board hereinafter referred to as electronics board 111. The electronics board 111 and lamp electronics 110 may be configured to fit into the lower housing 104.

One embodiment of a LED lamp and suitable LED structure is shown and described in U.S. patent application Ser. No. 12/873,303 entitled "Troffer-Style Fixture" filed on Aug. 31, 2010, which is incorporated by reference herein in its entirety. Example embodiments of interfacing one or more LEDs to AC-output lighting ballasts are described in a related U.S. patent application entitled "LED LIGHTING APPARATUS FOR USE WITH AC-OUTPUT LIGHTING BALLASTS" by Zhang et al., Ser. No. 13/943455, filed concurrently with this application, the disclosure of which is incorporated by reference herein in its entirety. Example embodiments of interfacing LED strings to fluorescent emergency lighting ballasts are described in a related U.S. patent application entitled "EMERGENCY LIGHTING CONVERSION FOR LED STRINGS" by McBryde et al., Ser.No.14/943376, filed concurrently with this application, the disclosure of which is incorporated by reference herein in its entirety. Example embodiments of suitable driver circuitry for use in the lamp of the invention are described in U.S. application Ser. No. 14/055,264 entitled "SOLID-STATE LIGHTING APPARATUS WITH FILIAMENT IMITATION FOR USE WITH FLORESCENT BALLASTS" by Zhang, filed Oct. 16, 2013, the disclosure of which is incorporated by reference herein in its entirety; and U.S. application Ser. No. 14/256,573 entitled "SOLID-STATE LIGHTING APPARATUS WITH FILIAMENT IMITATION FOR USE WITH FLORESCENT BALLASTS" by Zhang, filed Apr. 18, 2014, the disclosure of which is incorporated by reference herein in its entirety.

The term "electrical path" can be used to refer to the entire electrical path to the LED's 127, including an intervening power supply disposed between the electrical connection that would otherwise provide power directly to the LEDs and the LED array, or it may be used to refer to the connection between the mains and all the electronics in the lamp, including the power supply. The term may also be used to refer to the connection between the power supply and the LEDs.

The interconnect 160 has a support 162 that is configured to fit into the lower housing 105. For example where lower housing 105 defines a generally cylindrical cavity 109 the support 162 may be generally cylindrical and configured to fit into the cavity. The support 162 is a generally planar member that fits transversely in the housing. A plurality of first engagement members 164 extend from a first side of the support 162. The first engagement members 164 may engage mating second engagement members on the optically transmissive enclosure 112 as will be described. In one embodiment, the first engagement members 164 comprise deformable resilient fingers 166 that comprise a camming surface 167 and a lock surface 169. In the illustrated embodiment four fingers 166 are provided although a greater or fewer number of fingers may be provided. The fingers 166 may be made as one-piece with the support 162. For example, the support 162 and fingers 166 may be molded of plastic.

A plurality of second engagement members 170 extend from a second side of the support 162 opposite to the first engagement members 164. The second engagement members 170 may engage the electronics board 111. In one embodiment, the second engagement members comprise deformable resilient fingers 171 that comprise a camming surface 172 and a lock surface 173 as previously described. In the illustrated embodiment two fingers 171 are provided although a greater or fewer number of fingers may be provided. The fingers 171 may be made as one-piece with the support 162 and fingers 166. For example, the support 162 and fingers 166 and 171 may be molded of plastic. The fingers 171 engage an edge of the electronics board 111 and may be inserted into recesses 113 formed at the edge of the board 111 to fix the angular position of the board 111 relative to the interconnect 160. A plurality of spacers 174 may also extend from the second side of the support 162 that engage the top surface of the electronics board 111 to fix the axial position of the board 111 relative to the support 162. The spacers 174 also form abutment surfaces against which the electronics board 111 is pressed by the fingers 171 such that the axial position of the board is fixed relative to the interconnect 160.

The electronics board 111 may comprise electrical conductors or pads 180 where the electrical conductors or pads 180 are electrically coupled to the lamp electronics 110 on the board. The pads 180 are electrically coupled to spring conductors 182 that extend away from the board 111 and are inserted through apertures 176 formed in the support 162 of interconnect 160. In other embodiments the conductors 182 may be mounted in the support 162 and may make a pressure contact with the pads 180 when the board 111 is mounted on the interconnect 160. The number of conductors 182 used is dictated by the arrangement of the lamp electronics, the number of LED boards and whether the boards are connected in series or in parallel. Support walls 184 extend from the periphery of the apertures 176 for supporting the spring conductors 182.

Figure 8:
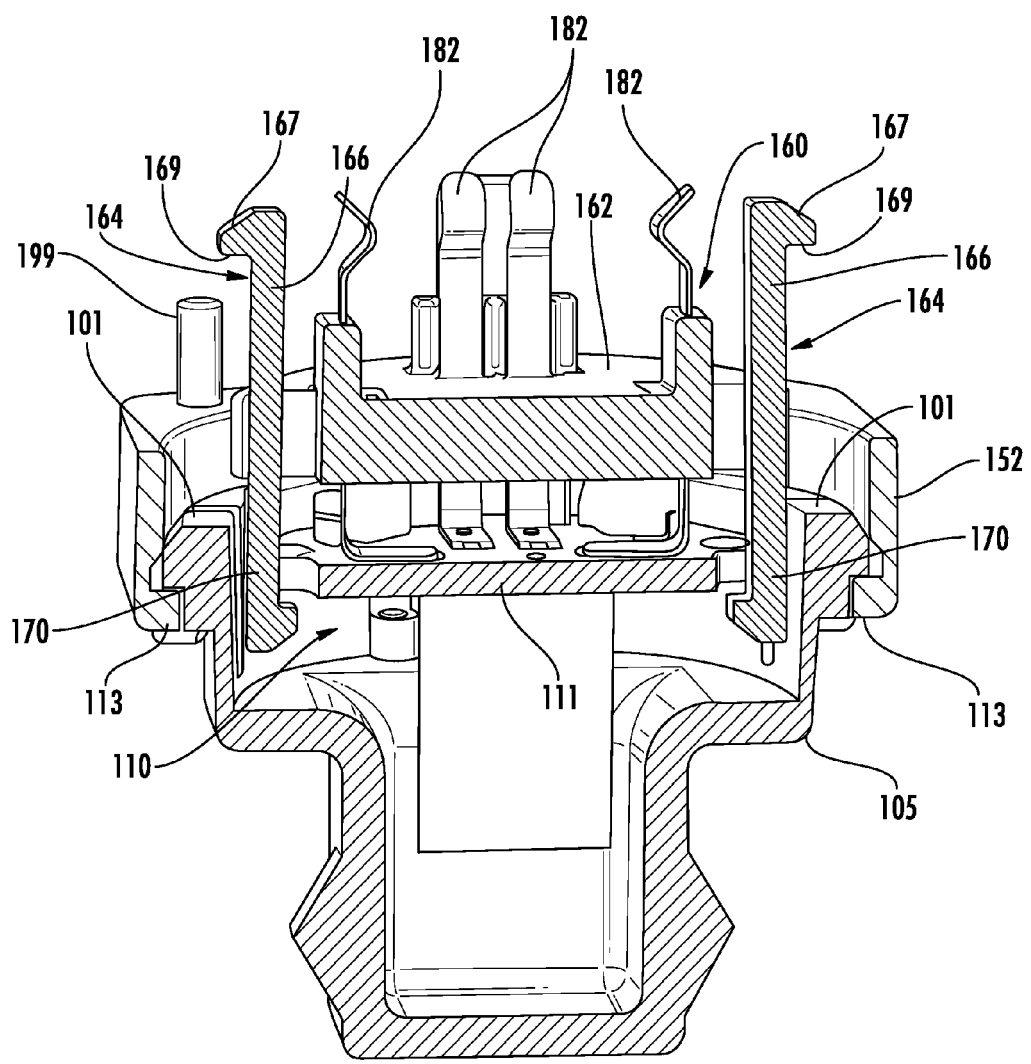
FIG. 8 is a perspective section view of the lamp of FIG. 1.
Figure 9:
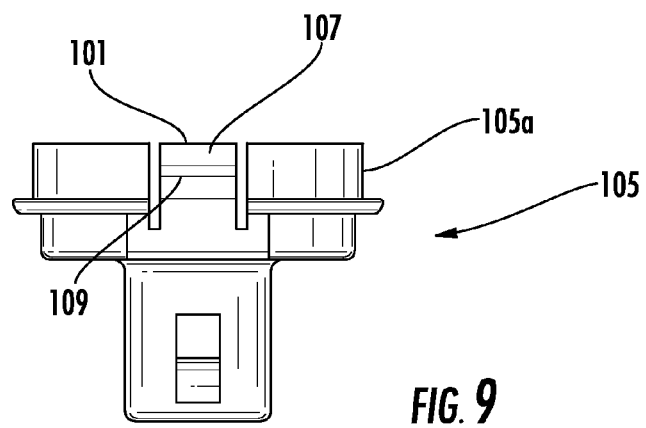
FIG. 9 is a plan view of an embodiment of the lower housing usable in the lamp of the invention.
Figure 10:
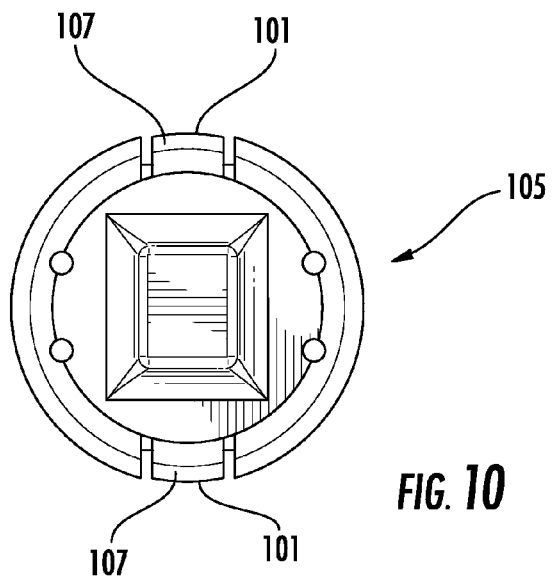
FIG. 10 is a top view of the lower housing of FIG. 9.
Figure 11:
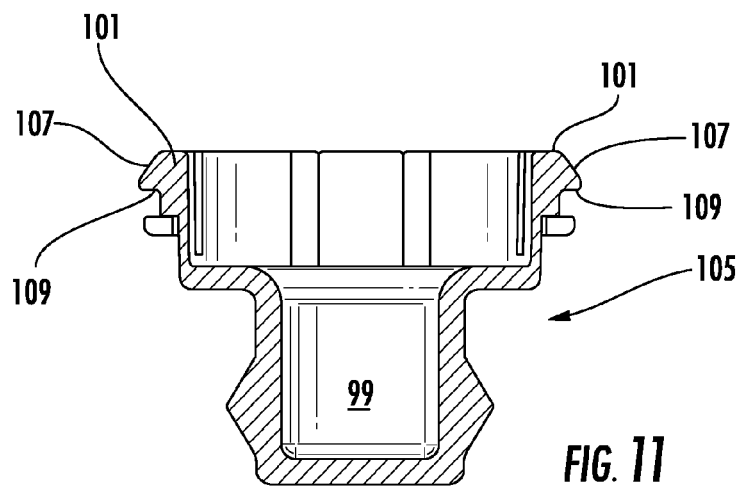
FIG. 11 is a section view of the lower housing of FIG. 9.
Figure 13:
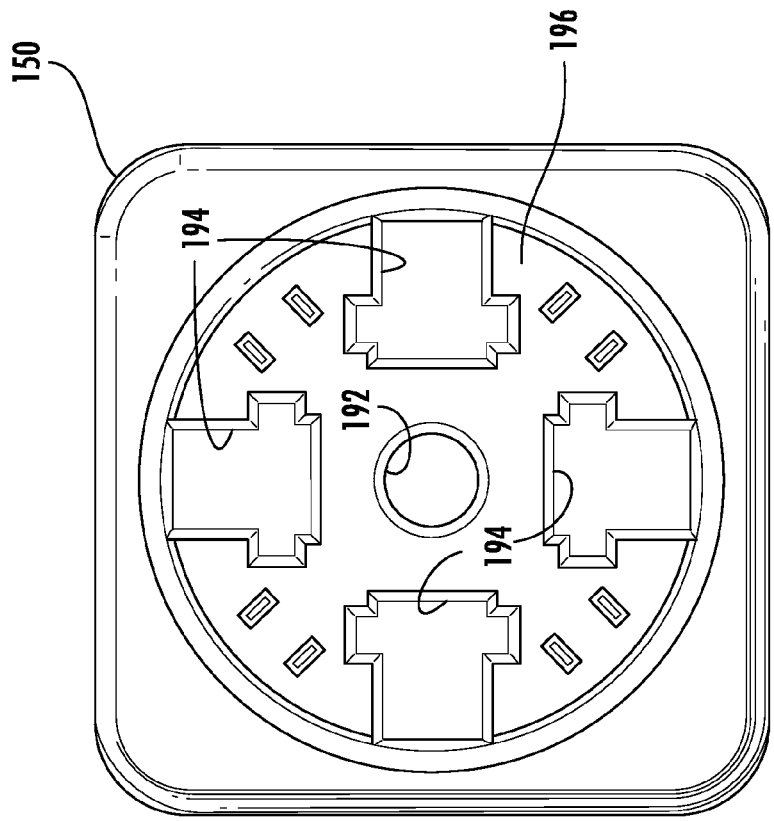
FIG. 13 is a top view of the upper housing of FIG. 12.
Figure 12:
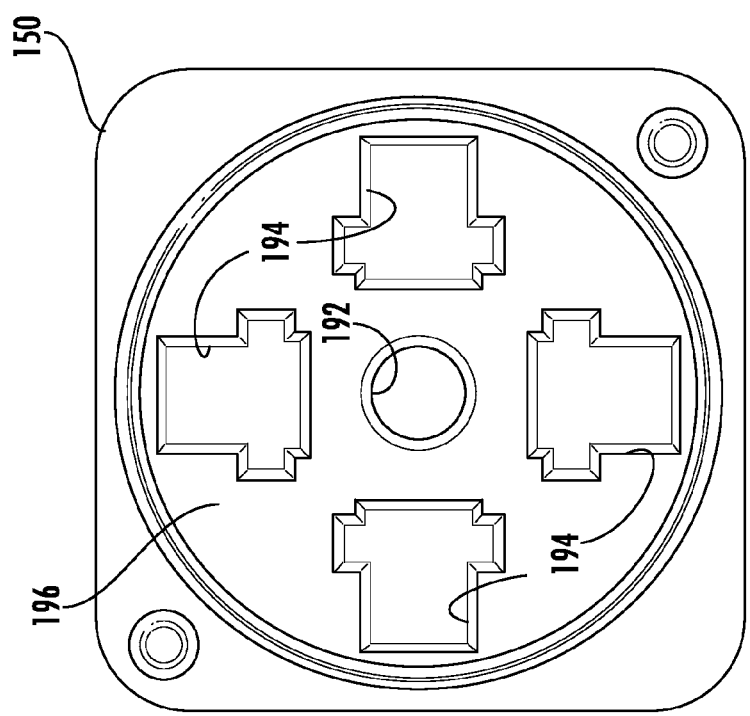
FIG. 12 is a bottom view of an embodiment of the upper housing usable in the lamp of the invention.
Figure 16:
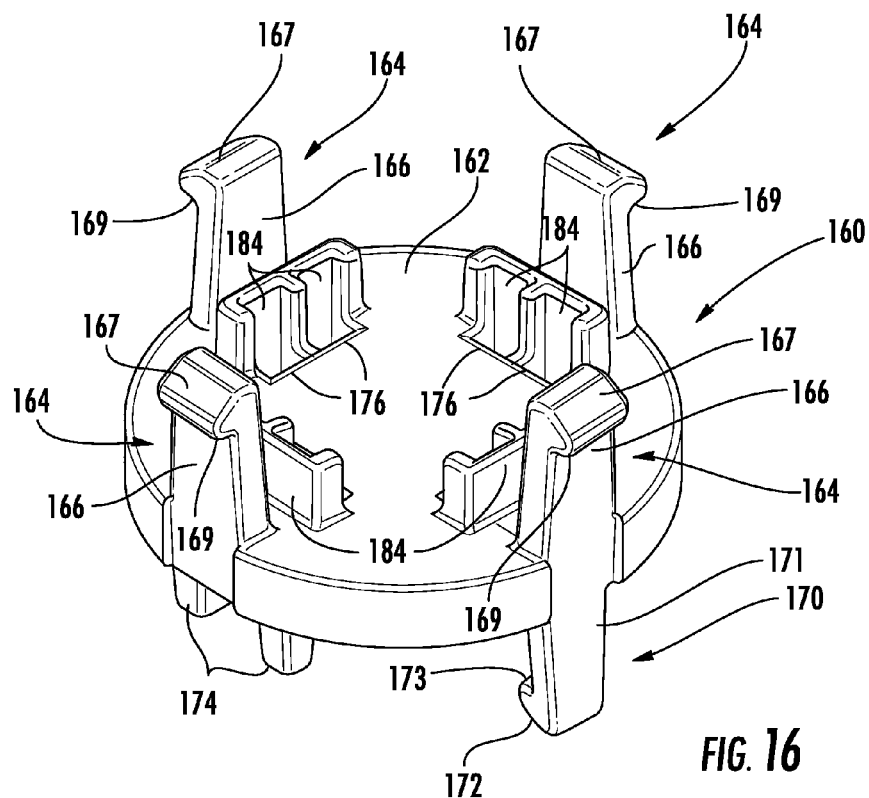
FIG. 16 is a perspective view of an embodiment of the interconnect usable in the lamp of the invention.
Figure 17:
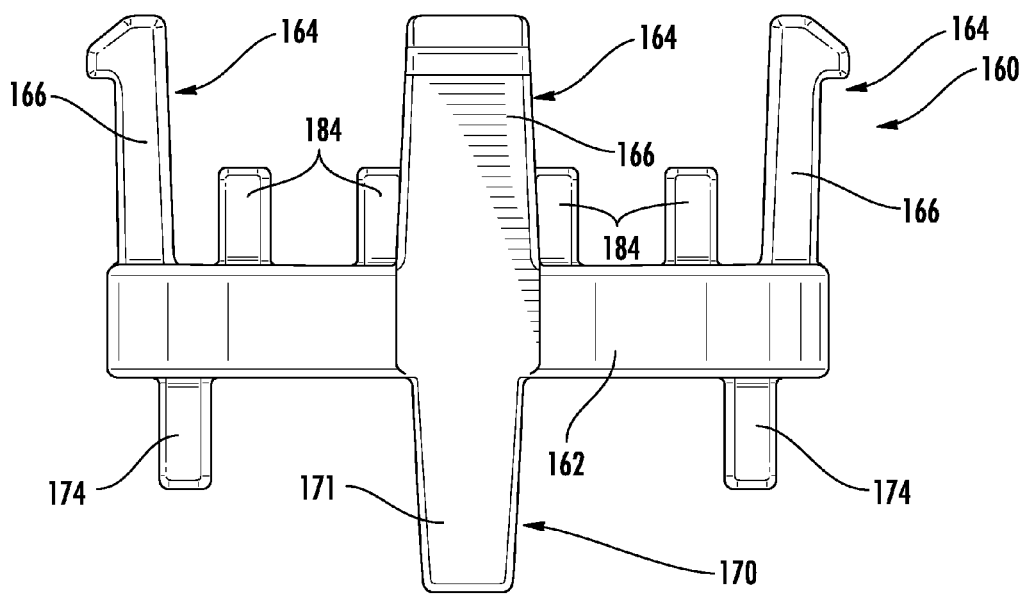
FIG. 17 is a side view of the interconnect of FIG. 16.
Figure 18:
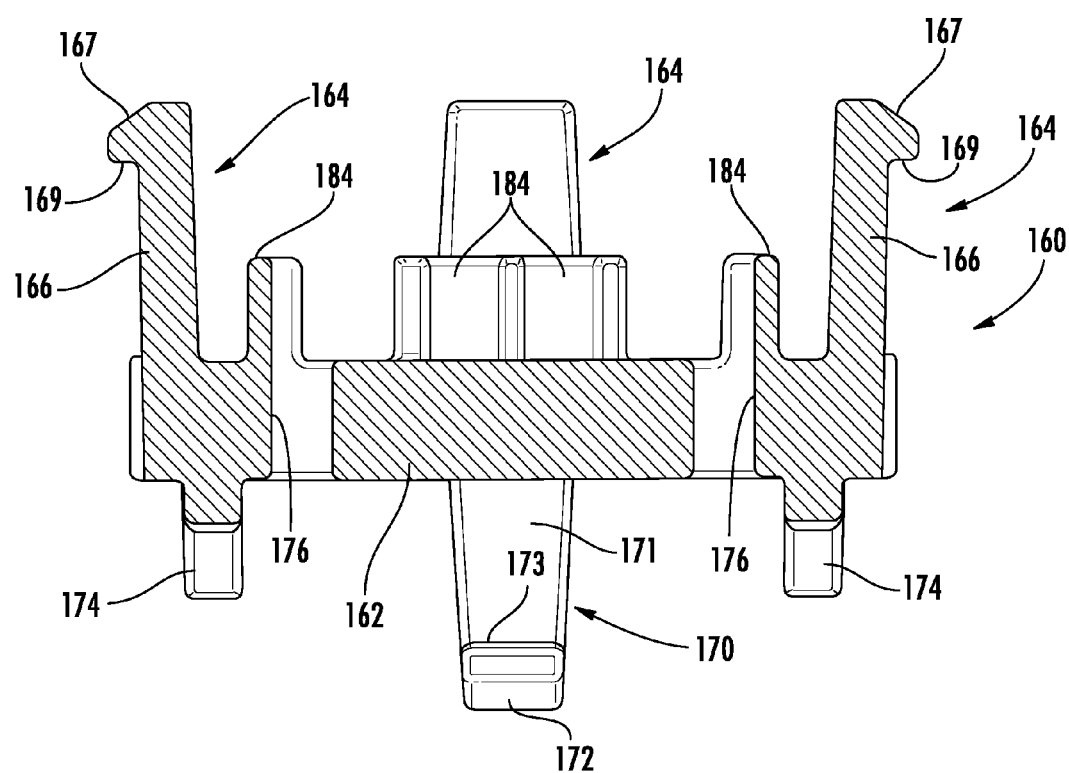
FIG. 18 is a section view of the interconnect of FIG. 16.
Figure 20:
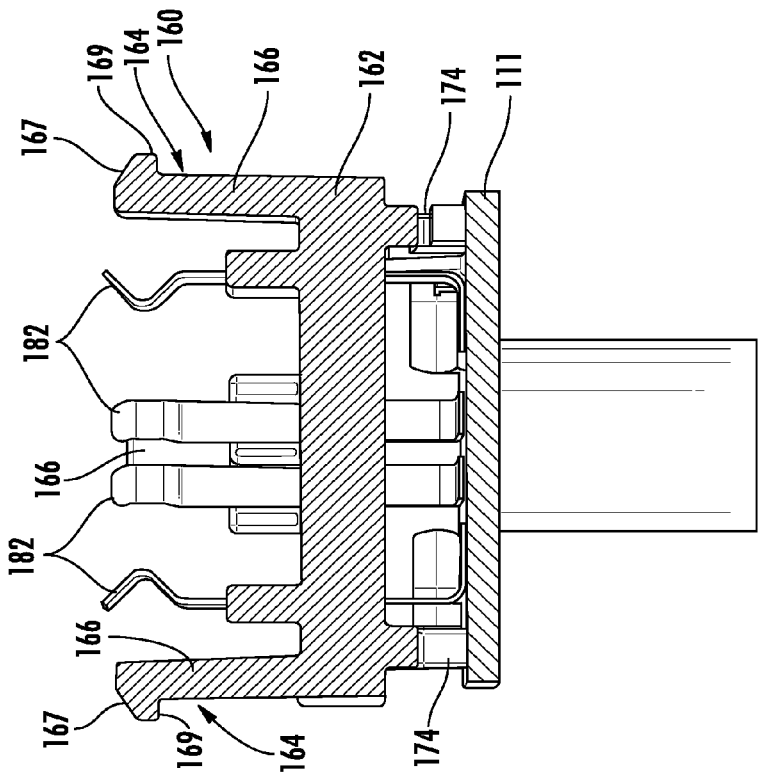
FIG. 20 is a section view of FIG. 19.
Figure 19:
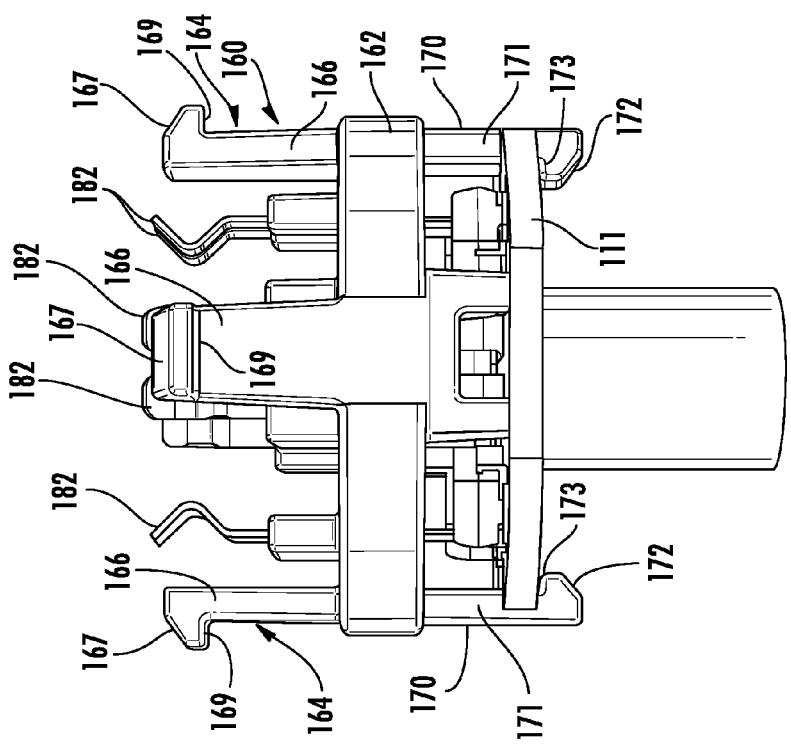
FIG. 19 shows the interconnect of FIG. 16 mounted to the lamp electronics.
Figure 23:
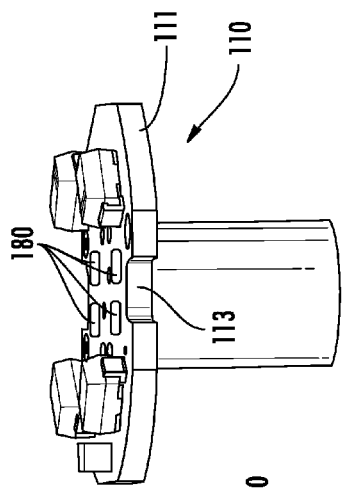
FIG. 23 is a perspective view of the lamp electronics of FIG. 20.
Figure 26:
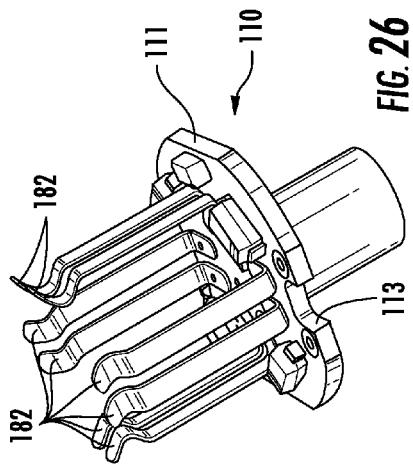
FIG. 26 is a perspective view of the lamp electronics of FIG. 22.
Figure 22:
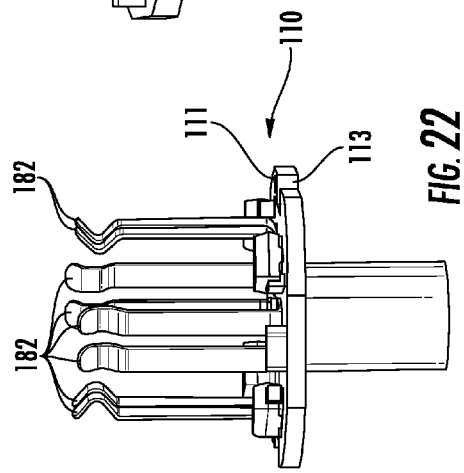
FIG. 22 is a side view of the lamp electronics of FIG. 20 with the spring contacts.
Figure 25:
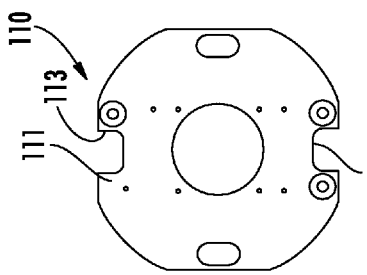
FIG. 25 is a bottom view of the lamp electronics of FIG. 20.
Figure 21:
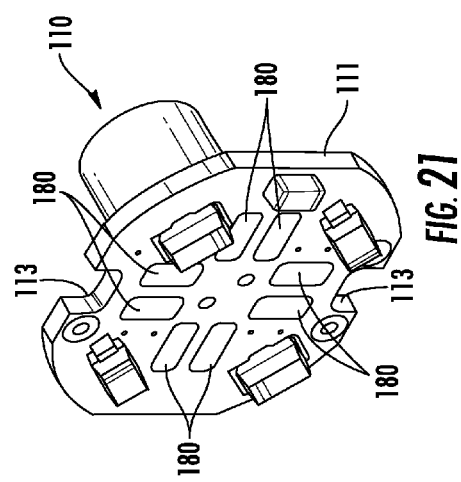
FIG. 21 is a perspective view of an embodiment of the lamp electronics usable in the lamp of the invention.
Figure 24:
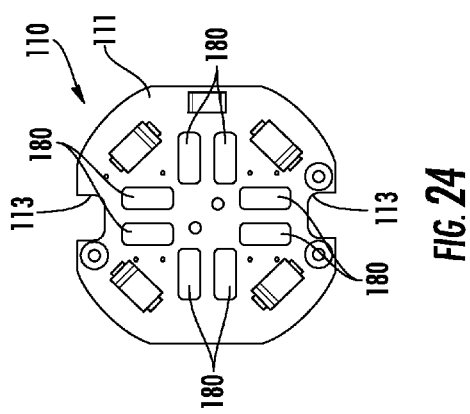
FIG. 24 is a top view of the lamp electronics of FIG. 20.

After the board 111 is connected to the interconnect 160, the interconnect 160 and board 111 are inserted into the lower housing 105 such that the fingers 164 extend away from the lower housing 105 as shown in FIG. 8. The lamp electronics 111 are electrically coupled to the pins 103 using a suitable electrical connection such as a soldered connection or a spring conductor connection. For example, in one embodiment wires may be soldered to the pins 103 and to pads on the electronics board 111 to complete the electrical connection from the pins 103 to the lamp electronics. In another embodiment spring conductors similar to conductors 182 may extend from the electronics board 111 and may be deformed and biased into engagement with the pins 103. Other electrical connectors may also be used.

A heat sink 149 is used to conduct heat away from the LED assembly 130 and to dissipate heat to the ambient environment. The heat sink 149 is formed as a tower that extends from the base 102 along the longitudinal axis of the lamp. The bottom end 149a of the heat sink 149 is connected to the upper housing 150 by a screw 190. In one embodiment the screw 190 may be inserted through an unthreaded aperture 192 in the upper housing 150 and engage a threaded bore in the bottom of the heat sink 149. In other embodiments the screw may be made integrally with one of the heat sink 149 and the upper housing 150 and threaded into engagement with a threaded bore on the other one of the upper housing and heat sink. Other mechanisms for attaching the heat sink 149 to the upper housing 150 may also be used. The heat sink 149 is configured such that the heat sink occupies the space occupied by the compact fluorescent tubes in a traditional CFL bulb. In a CFL bulb the fluorescent Accordingly, the heat sink 149 extends along the longitudinal axis of the lamp and has a relatively long narrow configuration that is similar to the elongated configuration of the compact fluorescent tubes in a traditional CFL bulb. Because a LED based lamp that is used as a replacement for a CFL bulb operates at relatively high power and produces significant lumens, a significant amount of heat is generated by the LED assembly. Use of a relatively large heat sink is required to dissipate heat from the lamp to provide good thermal control for the LEDs. Because it is desired that the lamp be configured to match the relatively long narrow form factor of a CFL bulb, the use of a large external heat sink is not used. Rather the interior envelope of the lamp (occupied by the fluorescent tubes in a traditional CFL bulb) is used to house a heat sink having a shape and dimensions to fit inside of the form factor of the CFL tubes. Not only does the heat sink fit inside of the envelope of the traditional CFL tubes, the heat sink substantially fills this space in order to provide maximum surface area for dissipating heat from the LEDs 127.

The upper housing 150 is secured to the middle housing 152 to complete the base 102. The electrical conductors 182 and support walls 164 of interconnect 160 are inserted into apertures 194 formed in the transverse surface 196 of the upper housing 150. The conductors 182 are configured such that the free ends of the conductors 182 extend above the transverse surface 196 and are located opposite to the heat sink 149 when the upper housing 150 is seated on the middle housing 152. The upper housing 150 may be secured to the middle housing 152 by any suitable connection mechanism. In the illustrated embodiment screws 198 and pins 199 are used to position and connect the upper housing 150 to the middle housing 152; however, a snap-fit connection, adhesive or the like may be used. The upper housing 150 and middle housing 152 when connected together function to trap the interconnect 160 and electronics board 111 in position in the base 102.

Figure 38:
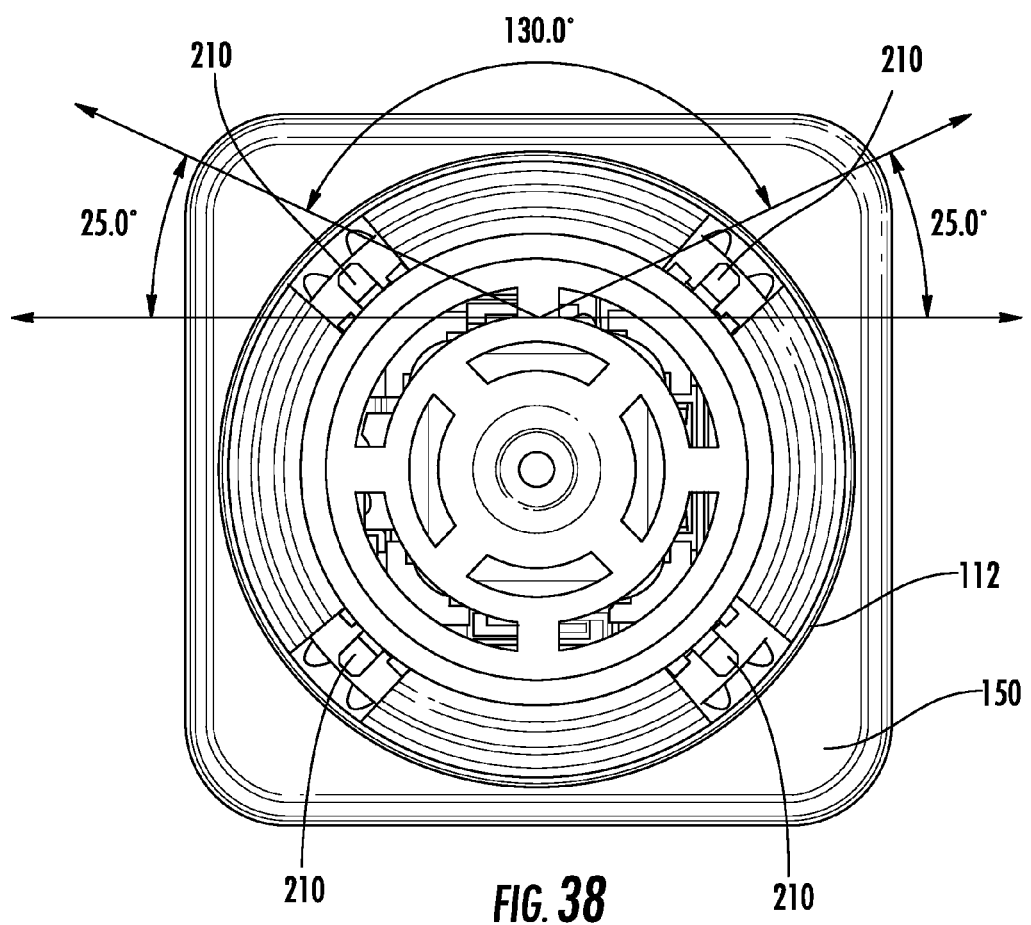
FIG. 38 is a top view of the lamp of FIG. 1.

The heat sink 149 comprises a tower made of a thermally conductive material such as aluminum, zinc or other thermally conductive material. The heat sink 149 may be made as one piece or it may be made as separate pieces connected together to form the heat sink. The heat sink 149 comprises LED assembly mounting surfaces 200 that extend for substantially the length of the heat sink. In the illustrated embodiment four LED assembly mounting surfaces 200 are provided although a greater or fewer number of mounting surfaces may be used. Using four mounting surfaces 200 allows a string of LEDs 127 to be provided along each of the four sides of the lamp such that the lamp emits light in a pattern similar to the light pattern of traditional CFL bulbs. Each mounting surface 200 comprises a generally planar surface that is thermally coupled to an LED assembly 130. A flange 202 may be provided that extends along the length of each of the longitudinal sides of the mounting surfaces 200 to create a pair of opposed channels 204 that receive the longitudinal edges of the LED assemblies 130. The flanges 202 may engage the LED board of the LED assembly in a relatively tight friction fit to retain the LED assembly on the heat sink. A thermal epoxy or similar material may be used to thermally and physically couple the LED assemblies 130 to the mounting surfaces 200. A plurality of fins 210 extend from the heat sink and extend to the exterior of the lamp to dissipate heat from the LEDs to the ambient environment. The fins 210 may extend from the corner structure that forms the flanges 202 and may extend at a 45 degree angle relative to the mounting surfaces 200, on a diagonal of the heat sink, such that the fins 210 do not block light emitted from the LEDs. Referring to FIG. 38 the LEDs 127 may emit light at an angle of approximately 130 degrees. By angling the fins and limiting the length of the fins to not interrupt the light emitted from the LEDs the light from the adjacent LED assemblies 130 overlap and no striping occurs.

The LED assembly 130 may be implemented using an LED board 129 on which are mounted a plurality of LEDs 127. Multiple LEDs 127 can be used together, forming an LED array. The LEDs 127 can be mounted on or fixed within the lamp in various ways. The LEDs 127 in the LED array include LEDs which may comprise an LED die or a plurality of LED dies disposed in an encapsulant such as silicone, and LEDs which may be encapsulated with a phosphor to provide local wavelength conversion. A wide variety of LEDs and combinations of LEDs may be used in the LED assembly 130 as described herein. The LEDs 127 are operable to emit light when energized through the electrical path. The LED board 129 may comprise a series of anodes and cathodes arranged in pairs for connection to the LEDs 127. An LED 127 containing at least one LED or LED package is secured to each anode and cathode pair where the LED spans the anode and cathode. The LEDs 127 may be attached to the LED board 129 by soldering. While specific embodiments of LEDs are described herein, a greater or fewer number of anode/cathode pairs and LEDs may be used and the specific placement of the LEDs on LED boards 129 may vary from that shown.

LEDs 127 used with embodiments of the invention can include light emitting diode chips that emit hues of light that, when mixed, are perceived in combination as white light. Phosphors can be used as described to add yet other colors of light by wavelength conversion. For example, blue or violet LEDs can be used in the LED assembly of the lamp and the appropriate phosphor can be in any of the ways mentioned above. LED devices can be used with phosphorized coatings packaged locally with the LEDs or with a phosphor coating the LED die as previously described. For example, blue-shifted yellow (BSY) LED devices, which typically include a local phosphor, can be used with a red phosphor on or in the optically transmissive enclosure or inner envelope to create substantially white light, or combined with red emitting LED devices in the array to create substantially white light.

A lighting system using the combination of BSY and red LED devices referred to above to make substantially white light can be referred to as a BSY plus red or "BSY+R" system. In such a system, the LED devices used include LEDs operable to emit light of two different colors. In one example embodiment, the LED devices include a group of LEDs, wherein each LED, if and when illuminated, emits light having dominant wavelength from 440 to 480 nm. The LED devices include another group of LEDs, wherein each LED, if and when illuminated, emits light having a dominant wavelength from 605 to 630 nm. A phosphor can be used that, when excited, emits light having a dominant wavelength from 560 to 580 nm, so as to form a blue-shifted-yellow light with light from the former LED devices. In another example embodiment, one group of LEDs emits light having a dominant wavelength of from 435 to 490 nm and the other group emits light having a dominant wavelength of from 600 to 640 nm. The phosphor, when excited, emits light having a dominant wavelength of from 540 to 585 nm. A further detailed example of using groups of LEDs emitting light of different wavelengths to produce substantially while light can be found in issued U.S. Pat. No. 7,213,940, which is incorporated herein by reference.

In some embodiments, the LED boards 129 may comprise a PCB, such as FR4 board, a metal core printed circuit board (MCPCB), or other similar structure. In other embodiments the electrical connections may be made using a flex circuit, lead frame, wires or the like. In some embodiments where the board and/or electrical connections do not have sufficient structural rigidity to adequately support the LEDs in position in the lamp, the electrical circuitry may be mounted on a structurally rigid substrate. The LED boards 129 comprise a thermally conductive material supported on a dielectric material or other electrically insulating material or materials.

The thermally conductive area may be formed as part of the electrical path connecting the LEDs 127 to the electronics 110 in the base 102. In some embodiments a large area of the LED board 129 may be thermally conductive such that a large area of the entire LED assembly 130 acts as a heat dissipative element to transfer heat to the heat sink. The copper, aluminum, other metal or other thermally conductive material on the LED boards 129 may form part of the electrical path to the LEDs 127. In one embodiment electrical contact pads 125 are formed near the bottom of the LED assembly that are contacted by spring conductors 182 when the LED assemblies 130 and heat sink 149 are mounted on the base 102. The LED board 129 is inserted behind the spring conductors 182 such that the conductors are deformed into engagement with the pads 125. The deformation of the spring conductors 182 creates a biasing force that forces the conductors 182 into engagement with the pads 125 formed on the LED assembly 130 such that a good electrical connection is made between the conductors 182 and the electrical circuitry of the LED assembly 130.

The exposed surfaces of the LED assembly 130 and heat sink 149 may be reflective. The surfaces of the LED assembly other than the light emitting LEDs may be covered in a reflective material such as injection molded white plastic, white optics, PET, MCPET, or other reflective material. In some embodiments the reflective surfaces may be a specular reflector material such as injection molded plastic or die cast metal (aluminum, zinc, magnesium) with a specular coating. A reflective coating may also be applied via vacuum metallization or sputtering, and could be aluminum or silver. The reflective surface may also be a formed film, formed aluminum, or the like. The entire LED assembly 130, other than the LEDs 127, may be made of or covered in the reflective surface, refractive optic surface, spreading surface and/or diffuse reflective surface or portions of the LED assembly 130 may be made of or covered in the reflective surface, refractive optic surface, spreading surface and/or diffuse reflective surface. For example, portions of the LED assembly 130 that reflect light may be made of or covered in reflective surface, refractive optic surface, spreading surface and/or diffuse reflective surface while the remainder of the LED assembly 130 may comprise other materials including non-reflective materials. The reflective surface may be applied to the LED boards 129 with "cutouts" provided to expose the LEDs 127.

Figure 30:
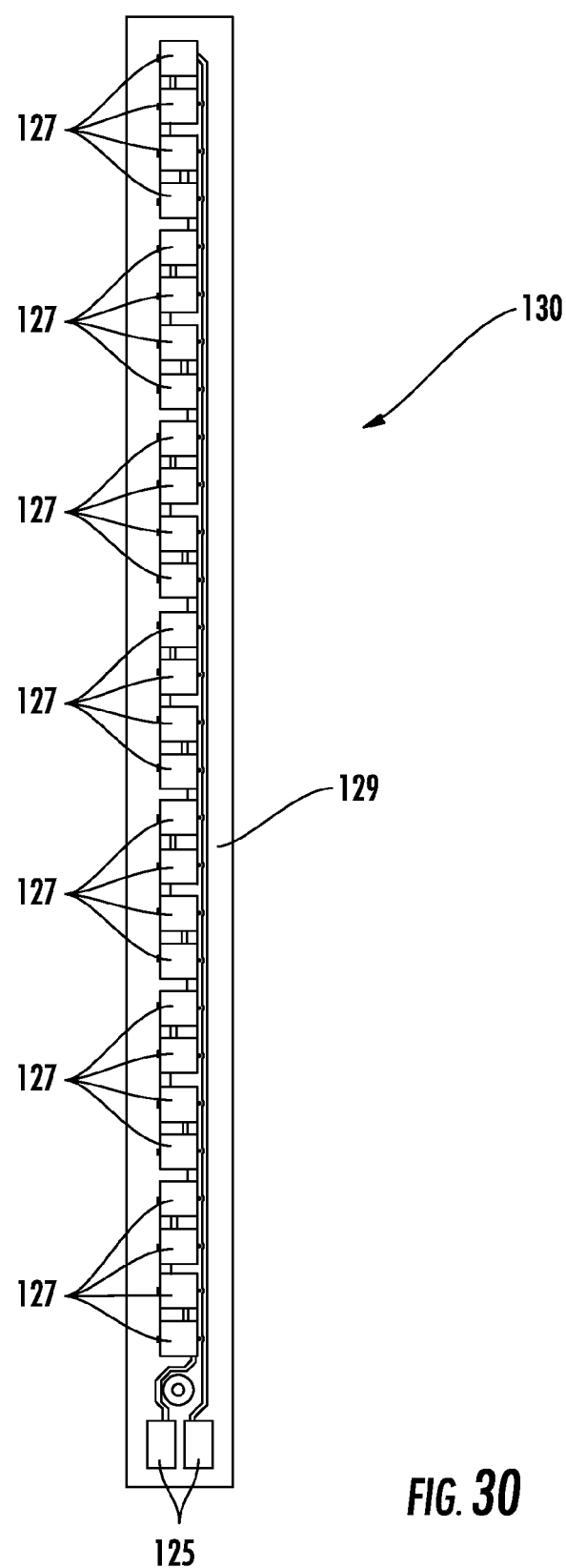
FIG. 30 is a plan view of an embodiment of the LED assembly usable in the lamp of the invention.
Figure 31:
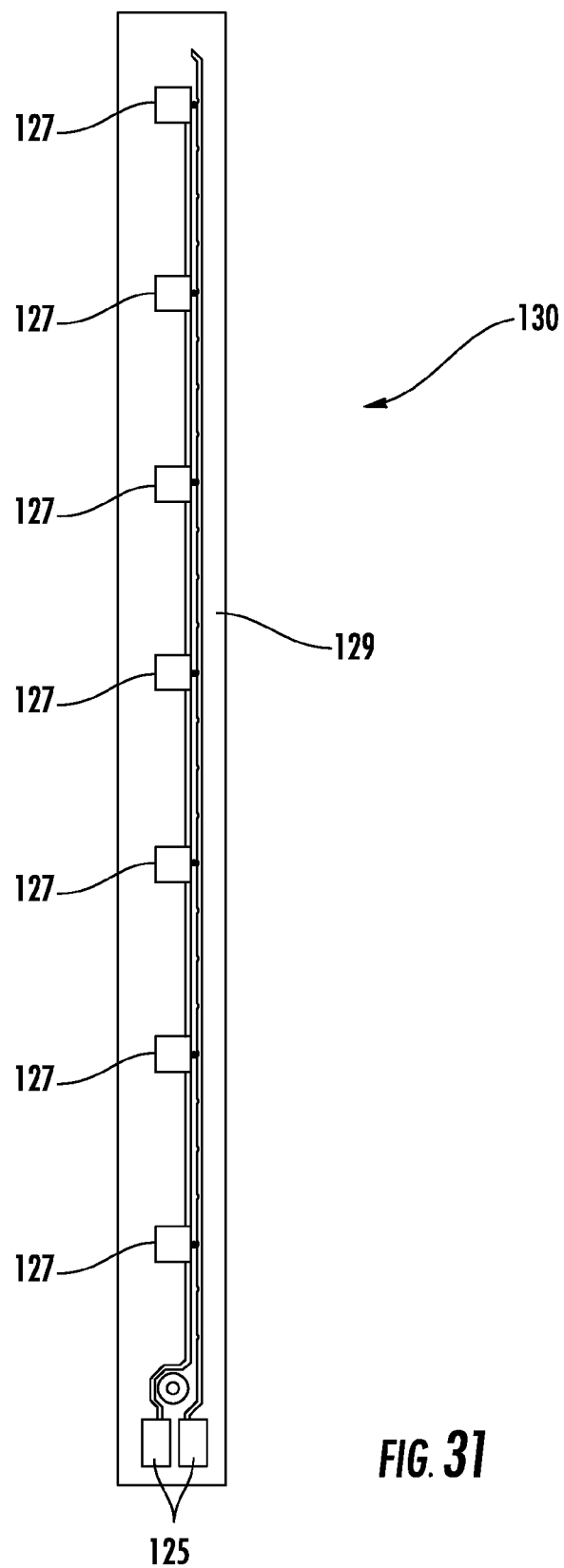
FIG. 31 is a plan view of another embodiment of the LED assembly usable in the lamp of the invention.
Figure 36:
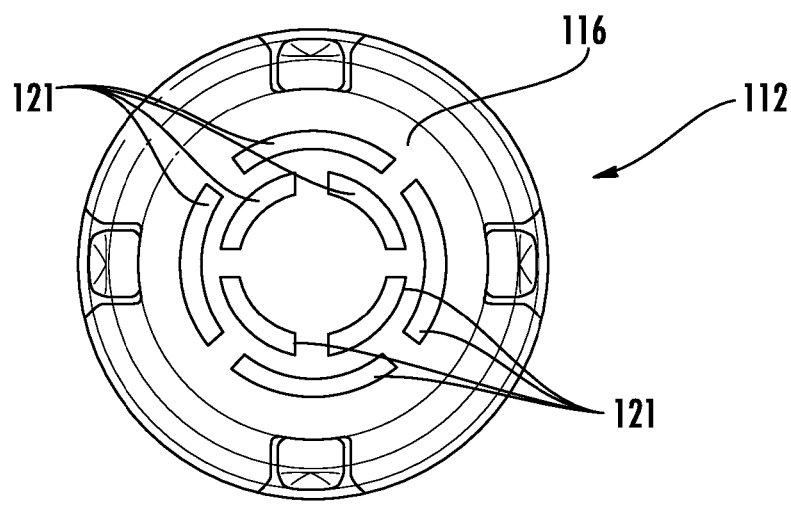
FIG. 36 is a top view of an embodiment of the optically transmissive enclosure.
Figure 37:
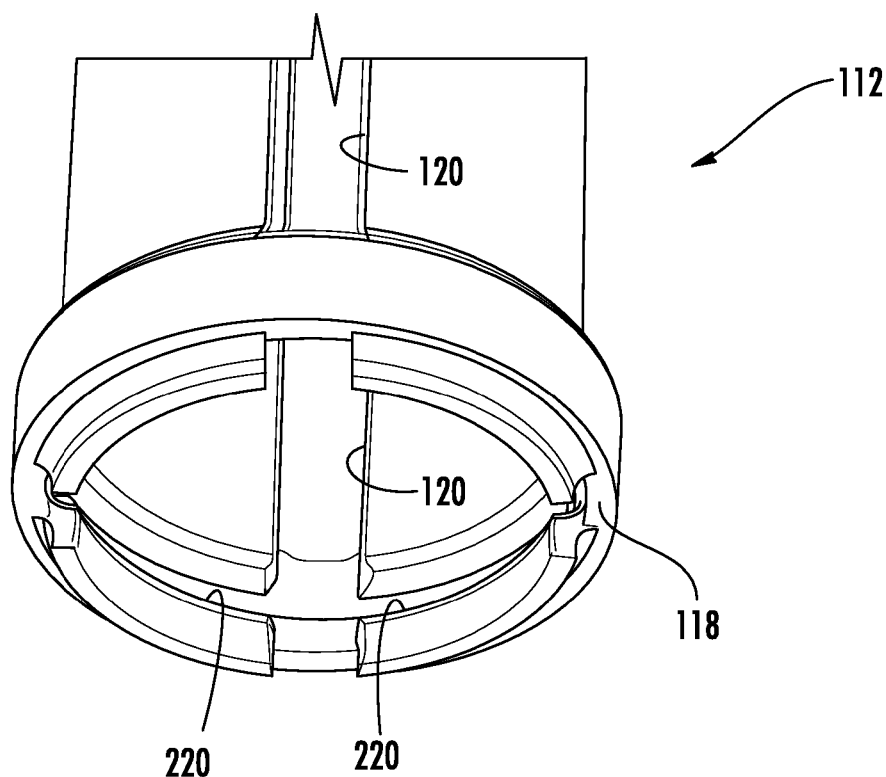
FIG. 37 is a bottom perspective view of an embodiment of the optically transmissive enclosure.

In one embodiment each LED assembly may comprise 7 XTE LEDS manufactured and sold by CREE Inc. where four LED assemblies are used for a total of 28 LEDs (FIG. 31). The LEDs may be arranged in two parallel strings with 14 LEDs (two LED assemblies 130) in each string. Such a solid state lamp may operate between approximately 16-19 Watts and produce at least 900 lumens. Such a lamp may be used as a replacement for a 26 Watt CFL bulb. A lamp using the 28 XTE LEDs operates at approximately between 16 and 17 Watts and produces approximately 960 lumens with a CRI greater than or equal to 90 and an R9 value greater than 50. In other embodiments a greater number of LEDs, or combinations of different LEDs, may be used to create a lamp that produces 1440 lumens and/or 1920 lumens to correspond to traditional 26 Watt and 32 Watt CFL bulbs. Other lumen outputs may also be provided. The CCT may be approximately 2700K, 3000K, 3500K, 4000K or in a range of between approximately 2700 and 4000K. In another embodiment each LED assembly 130 may comprise 28 XHG LEDs (FIG. 30) manufactured and sold by CREE Inc. where four LED assemblies are used for a total of 112 LEDs. In some embodiments the lamp operates to produce at least 80 lumens per Watt and in other embodiments the lamp operates to produce at least 90 lumens per Watt. The LEDs 127 are spaced along the length of the LED assembly 130 such that light is emitted in a pattern that is similar to the light pattern emitted by a CFL bulb. In one embodiment the LEDs extend from adjacent the base 102 to adjacent the end of the heat sink such that light is emitted over substantially the length of the heat sink 149. In this manner the heat sink substantially fills the space occupied by the fluorescent bulbs in a traditional CFL bulb and the LEDs are mounted over the surface of the heat sink such that light is emitted in a pattern similar to the fluorescent bulbs in a traditional CFL bulb. By this arrangement the heat dissipating capability of the heat sink is maximized while maintaining the form factor and light pattern of a traditional CFL bulb. Because of the small form factor of the lamp and the amount of current driving the lamp of approximately 360 mA to achieve equivalent brightness of traditional CFL lamps a good thermal management system is required and is achieved by configuring the heat sink 149 to substantially fill the space occupied by the fluorescent tubes in a traditional CFL lamp.

The LED assembly 130 and heat sink 149 may be contained in an optically transmissive enclosure 112 through which light emitted by the LEDs 127 is transmitted to the exterior of the lamp. The enclosure 112, may be made of acrylic or polycarbonate. In other embodiments the enclosure may be made of glass, quartz, borosilicate, silicate, or other suitable material. The enclosure 112 may be of a shape and dimensions similar to the shape and dimensions of the combined tubes in a CFL bulb. The enclosure 112 is formed as an elongated tube having a generally cylindrical side wall 114, a vented top wall 116 and a generally open bottom 118 that tapers slightly from the bottom 118 toward the top wall 116.

In some embodiments, the interior surface of the optically transmissive enclosure may be coated with silica, providing a diffuse scattering layer that produces a more uniform far field pattern. The enclosure 112 may also be etched, frosted or coated to provide the diffuser. In other embodiments the enclosure 112 may be made of a material such as polycarbonate where the diffuser is created by the polycarbonate material. Alternatively, the surface treatment may be omitted and a clear enclosure may be provided. The enclosure 112 may also be provided with a shatter proof or shatter resistant coating. It should also be noted that in this or any of the embodiments shown here, the optically transmissive enclosure or a portion of the optically transmissive enclosure could be coated or impregnated with phosphor or a diffuser. In some embodiments, the diffusion provided by the enclosure 112 is minimal to maximize the lumen output of the lamp.

The enclosure 112 comprises elongated slotted apertures 120 that extend along the longitudinal axis of the lamp and receive the fins 210 that extend along the length of the heat sink 149. An air gap is provided between the fins 210 and the apertures 120 such that the interior of the enclosure 112 is in communication with the exterior of the lamp. The apertures 120 allow air to circulate inside of the enclosure 112 and allow heat to be dissipated from the heat sink and fins 210 to the ambient environment. The top wall 116 may be vented to allow air to circulate out of the top of the enclosure 112 by providing apertures 121 in the top wall. In some embodiments the side wall of the enclosure may be solid other than the vertical apertures 120 as shown in FIG. 29. In other embodiments a plurality of vents or apertures 122 may be provided in the side wall 114 between the vertical apertures 120 to allow air to flow into, through and out of the enclosure 112 such that the air cools the LED assembly 130 inside of the enclosure. In one embodiment an aperture or apertures 108 are provided directly opposite to the LEDs 127 such that some of the light emitted from each LED is emitted from the lamp through the openings. The apertures may be formed as relatively narrow slots. Because some light loss occurs when transmitting light through a material, locating the apertures directly opposite the LEDs allows a portion of the light to be emitted from the lamp without these losses. In some embodiments the apertures may allow gaps of 2 mm or less in order to comply with regulatory requirements.

Because the lamp has a form factor that is similar to the form factor of a traditional CFL lamp, the height of the enclosure 112 may be approximately 4 times or more the width of the enclosure. The heat sink 149 extends over substantially the entire length and width of the enclosure from the base 102 to the top wall 116 such that heat may be dissipated from the lamp over a large area. Using the heat sink arranged as a tower inside of the enclosure also allows the lamp to be scalable. A greater or fewer number of LEDs may be used and arranged in various patterns to create lamps having different lumen output such that the same form factor may be used to make LED lamps that have the light output and physical configuration of different traditional CFL wattage bulbs.

To assemble the optically transmissive enclosure 112 to the lamp, a groove or grooves 220 are formed in the interior of the enclosure 112 adjacent the open bottom end 118. The groove 220 is configured to receive the locking fingers 166 formed on the interconnect 160 such that the locking surfaces 169 engage the walls of the slots 220 such that a snap-fit connection is created between the enclosure 112 and the interconnect 160.

Figure 39:
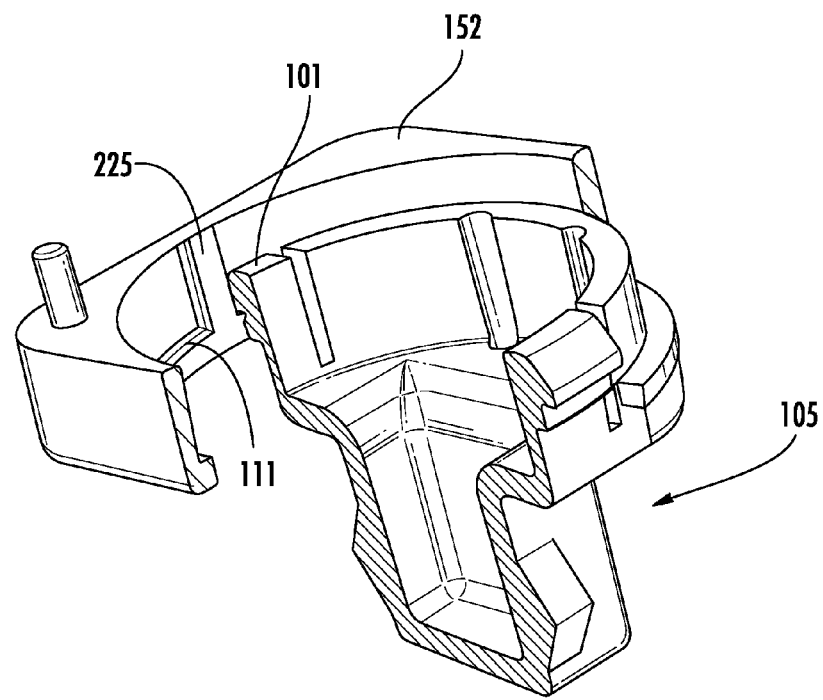
FIG. 39 is a perspective section view showing the lower and middle housings.
Figure 40:
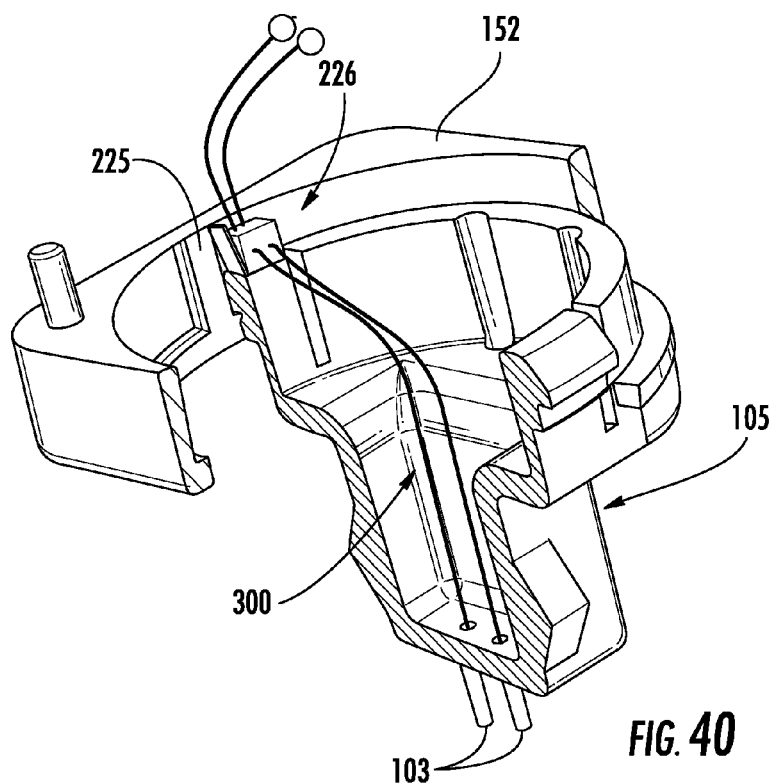
FIG. 40 is a perspective section view showing an alternate embodiment of the lower and middle housings.

In one alternate embodiment the snap-fit connection between the lower housing 105 and the middle housing 152 may be used to actuate a switch to control power to the LEDs 127. Referring to FIG. 39, as previously explained, engagement members 101 engage a protrusion 111 formed on the middle housing 152 using a snap-fit connection. This connection allows the lower housing 105 to be rotated relative to the middle housing 152. The rotation of the lower housing 105 relative to the middle housing 152 may be prevented using stops 225. In the embodiment of FIG. 40 the physical stop may engage an electrical switch 226. The switch 226 selectively connects and interrupts the electrical path 300 from the pins 103 to the LED assemblies 130 such that actuation of the switch may be used to control the lighting from one or more of the LED assemblies 130. In one embodiment the switch 226 may be used to control actuation of all of the LED assemblies such that the switch operates as an on/off switch for the lamp. In other embodiments the switch 226 may be used to control actuation of selected ones of the LED assemblies 130 such that the lamp may be used either as an omnidirectional lamp, typically used in vertical applications, or a directional lamp, such as used in horizontal applications. For example, the switch 225 may be used to turn off and on two of the adjacent LED assemblies 130 such that only two of the LED assemblies may be powered such that the lamp emits light only over one half of the lamp. In such an arrangement power may be delivered to two of the four LED assemblies 130 such that each of the two powered LED assemblies may be more brightly illuminated than each of the four illuminated LEDs. In such an application the lamp may be made to be directional and to increase the lumens emitted when used as a directional lamp.

In some embodiments a wireless module may be provided in the bulb for receiving, and/or transmitting, a radio signal or other wireless signal between the lamp and a control system and/or between lamps. The wireless module converts the radio wave to an electronic signal that may be delivered to the lamp electronics 110 for controlling operation of the lamp. The wireless module may be mounted on the board and be in communication with the lamp electronics. The wireless module may also be used to transmit a signal from the lamp. The wireless module may be positioned inside of the enclosure 112 such that the base 102 does not interfere with signals received by or emitted from wireless module. In various embodiments described herein various smart technologies may be incorporated in the lamps as described in the following applications "Solid State Lighting Switches and Fixtures Providing Selectively Linked Dimming and Color Control and Methods of Operating," application Ser. No. 13/295,609, filed Nov. 14, 2011, which is incorporated by reference herein in its entirety; "Master/Slave Arrangement for Lighting Fixture Modules," application Ser. No. 13/782,096, filed Mar. 1, 2013, which is incorporated by reference herein in its entirety; "Lighting Fixture for Automated Grouping," application Ser. No. 13/782,022, filed Mar. 1, 2013, which is incorporated by reference herein in its entirety; "Multi-Agent Intelligent Lighting System," application Ser. No. 13/782,040, filed Mar. 1, 2013, which is incorporated by reference herein in its entirety; "Routing Table Improvements for Wireless Lighting Networks," application Ser. No. 13/782,053, filed Mar. 1, 2013, which is incorporated by reference herein in its entirety; "Commissioning Device for Multi-Node Sensor and Control Networks," application Ser. No. 13/782,068, filed Mar. 1, 2013, which is incorporated by reference herein in its entirety; "Wireless Network Initialization for Lighting Systems," application Ser. No. 13/782,078, filed Mar. 1, 2013, which is incorporated by reference herein in its entirety; "Commissioning for a Lighting Network," application Ser. No. 13/782,131, filed Mar. 1, 2013, which is incorporated by reference herein in its entirety; "Ambient Light Monitoring in a Lighting Fixture," application Ser. No. 13/838,398, filed Mar. 15, 2013, which is incorporated by reference herein in its entirety; "System, Devices and Methods for Controlling One or More Lights," application Ser. No. 14/052,336, filed Oct. 10, 2013, which is incorporated by reference herein in its entirety; and "Enhanced Network Lighting," Application No. 61/932,058, filed Jan. 27, 2014, which is incorporated by reference herein in its entirety.

In some embodiments color control is used and RF control circuitry for controlling color may also be used in some embodiments. The lamp electronics may include light control circuitry that controls color temperature of any of the embodiments disclosed herein in accordance with user input such as disclosed in U.S. patent application Ser. No. 14/292,286, filed May 30, 2014, entitled "Lighting Fixture Providing Variable CCT" by Pope et al. which is incorporated by reference herein in its entirety.

Although specific embodiments have been shown and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

The invention claimed is:
1. A lamp comprising:
a base comprising at least one pin connector;
an elongated heat sink extending from the base, the heat sink defining at least four mounting surfaces extending along a longitudinal axis of the lamp;
a plurality of LED assemblies, each of the plurality of LED assemblies comprising at least one LED, at least one of the plurality of LED assemblies being mounted on each of the at least four mounting surfaces, the plurality of LED assemblies being electrically coupled to the at least one pin connector through an electrical path;
an at least partially optically transmissive enclosure defining an interior space having a first height, the heat sink having a second height where the second height is substantially the sane as the first height;
wherein lamp electronics in the electrical path are mounted in the base using an interconnect, the interconnect comprising a plurality of first engagement members that engage a plurality of mating second engagement members on the optically transmissive enclosure in a snap-fit connection to hold the enclosure to the base.

2. The lamp of claim 1 wherein the lamp has a length of between approximately 4 inches and approximately 8½ inches.

3. The lamp of claim 2 wherein the lamp has a width of approximately 1 inch to approximately 2 inches.

4. The lamp of claim 1 wherein the at least one LED produces at least 900 lumens.

5. The lamp of claim 1 wherein the base comprises a lower housing, an upper housing and a middle housing where the upper housing and the middle housing are made of a thermally conductive material and wherein third engagement members on one of the lower housing and the middle housing engage mating fourth engagement members on the other one of the lower housing and the middle housing to connect the middle housing to the lower housing in a snap-fit connection.

6. The lamp of claim 5 wherein the lamp electronics are mounted on an electronics board and the interconnect comprises a plurality of fifth engagement members that engage the electronics board in a snap-fit connection.

7. The lamp of claim 1 wherein the lamp electronics are mounted on an electronics board and spring conductors are electrically coupled to the electronics board, the spring conductors being biased into engagement with the LED assemblies.

8. The lamp of claim 7 wherein the spring conductors are inserted through apertures formed in the interconnect.

9. The lamp of claim 1 wherein the heat sink is formed as a tower that extends from the base along the longitudinal axis of the lamp.

10. The lamp of claim 1 wherein the mounting surfaces comprise a generally planar surface that is thermally coupled to the at least one of the plurality of LED assemblies.

11. The lamp of claim 1 wherein a plurality of fins extend from the heart sink and extend to the exterior of the lamp to dissipate heat from the LEDs to the ambient environment.

12. The lamp of claim 1 wherein the lamp operates to produce at least 80 lumens per Watt.

13. The lamp of claim 1 wherein the base comprises a first housing and a second housing, the first housing and the second housing being movable relative to one another, and a switch actuated by movement of the first housing and the second housing to control power to the plurality of LED assemblies through the electrical path.

14. The lamp of claim 13 wherein the enclosure omprises apertures that allow air to circulate across the heat sink.

15. The lamp of claim 1 wherein the lamp emits light with a CRI greater than or equal to approximately 90.

16. The lamp of claim 1 wherein the lamp emits light with a CCT in a range of between approximately 2700 and 4000K.

17. The lamp of claim 1 comprising the plurality of LED assemblies extend from adjacent the base to adjacent a distal end of the heat sink such that light is emitted over substantially the length of the heat sink.

18. The lamp of claim 1 wherein the at least one LED assembly operates at between 16 and 19 Watts and produces at least 900 lumens.

19. A LED lamp comprising:
a LED board supporting at least one LED;
a heat sink supporting the at least one LED board;
an optically transmissive enclosure, the heat sink and the at least one LED board being located in the enclosure;
a lamp electronics board:
a base comprising at least one pin connector;
an interconnect at least partially contained in the base, the interconnect comprising a first engagement member that engages a mating engagement member on the optically transmissive enclosure to directly secure the optically transmissive enclosure to the base, a second engagement member that engages an edge of the lamp electronics board to secure the lamp electronics board directly to the interconnect and a spring electrical conductor mounted on the interconnect electrically coupling the LED board to the lamp electronics board where the spring electrical conductor is electrically coupled to the lamp electronics board and deforms into engagement with an electrical contact pad on the LED board to create a pressure contact electrical coupling.

20. A LED lamp comprising:
a LED board comprising an electrical contact pad and support at least one LED;
a lamp electronics board;
an optically transmissive enclosure at least partially surrounding the at least one LED;
an interconnect comprising:
  a support;
  a first engagement member that comprises a resiliently deformable finger extending from the support that resiliently directly engages the optically transmissive enclosure;
  a second engagement member that comprises a resiliently deformable finger extending from the support that resiliently directly engages the lamp electronics board to secure the lamp electronics board directly to the interconnect; and
  a spring electrical conductor mounted on the interconnect configured to electrically couple the LED board to the lamp electronics board where the spring electrical conductor is electrically coupled to the lamp electronics board and deforms into engagement with the electrical contact pad to create a pressure contact electrical coupling.

* * * * *

UNITED STATES PATENT AND TRADEMARK OFFICE
CERTIFICATE OF CORRECTION

PATENT NO. : 9,851,077 B2  
APPLICATION NO. : 14/630926  
DATED : December 26, 2017  
INVENTOR(S) : Randy Demuynck Page 1 of 1

It is certified that error appears in the above-identified patent and that said Letters Patent is hereby corrected as shown below:

In the Claims

In Column 16, Claim 1, please change Line 17 to:
substantially the same as the first height;

In Column 16, Claim 11, please change Line 60 to:
from the heat sink and extend to the exterior of the lamp to In Column 17, Claim 14, please change Line 3 to:
14. The lamp of claim 13 wherein the enclosure comprises In Column 17, Claim 19, please change Line 22 to:
a lamp electronics board;

In Column 18, Claim 20, please change Line 9 to:
supporting at least one LED;

Signed and Sealed this
Tenth Day of April, 2018

Andrei Iancu
*Director of the United States Patent and Trademark Office*